US011973837B2

(12) United States Patent
Gottehrer et al.

(10) Patent No.: US 11,973,837 B2
(45) Date of Patent: Apr. 30, 2024

(54) CONNECTION SYSTEMS AND METHODS REQUIRING PHYSICAL PROXIMITY WHEN ESTABLISHING A CONNECTION BETWEEN USERS THEREOF

(71) Applicant: WavedIn Inc., Massapequa, NY (US)

(72) Inventors: Jonathan Gottehrer, Massapequa, NY (US); John K. Whiting, IV, South Boston, MA (US)

(73) Assignee: Jonathan Gottehrer, Massapequa, NY (US)

( * ) Notice: Subject to any disclaimer, the term of this patent is extended or adjusted under 35 U.S.C. 154(b) by 0 days.

(21) Appl. No.: 18/089,650

(22) Filed: Dec. 28, 2022

(65) Prior Publication Data

US 2023/0137352 A1 May 4, 2023

Related U.S. Application Data

(60) Provisional application No. 63/420,677, filed on Oct. 30, 2022.

(51) Int. Cl.
*G06F 15/16* (2006.01)
*H04L 67/306* (2022.01)
*H04L 67/52* (2022.01)
*H04M 1/72403* (2021.01)
*G06Q 50/00* (2012.01)

(52) U.S. Cl.
CPC ............ *H04L 67/306* (2013.01); *H04L 67/52* (2022.05); *H04M 1/72403* (2021.01); *G06Q 50/01* (2013.01)

(58) Field of Classification Search
CPC .. H04L 67/306; H04L 67/52; H04M 1/72403; G06Q 50/01
See application file for complete search history.

(56) References Cited

U.S. PATENT DOCUMENTS

| | | | | |
|---|---|---|---|---|
| 8,700,710 B1* | 4/2014 | Gallagher | ............... | H04W 4/80 709/227 |
| 2020/0380563 A1* | 12/2020 | Shiffert | ................. | H04W 4/023 |
| 2021/0037013 A1* | 2/2021 | Salkintzis | ........... | H04L 63/0892 |

* cited by examiner

*Primary Examiner* — Normin Abedin

(57) ABSTRACT

A proximity-locked connection system may include a server configured to communicate with a plurality of user devices, each user device operable by a user thereof, receive from user devices user device locations, calculate a distance between user devices of a pair of users, determine that a distance therebetween is within a connection threshold, and create a connection between the pair of users at least in part due to the distance being within a connection threshold. In some implementations, a server may maintain connection expiration dates (or connection expiration timers) at least in part based on locations received from user devices, wherein an expiration date (or expiration timer) may be reset for an existing connection given a distance between user devices associated therewith is within a connection refresh threshold. In some implementations, a server may disable (or delete) a connection upon an expiration date (or timer expiration) associated therewith.

19 Claims, 8 Drawing Sheets

CONNECTION SYSTEMS AND METHODS REQUIRING PHYSICAL PROXIMITY WHEN ESTABLISHING A CONNECTION BETWEEN USERS THEREOF

CROSS-REFERENCE TO RELATED APPLICATIONS

This application claims the benefit of U.S. Provisional Application No. 63/420,677, filed Oct. 30, 2022, entitled Connection Systems and Methods Requiring Physical Proximity when Establishing a Connection Between Users Thereof, which is hereby incorporated by reference in its entirety herein.

FIELD OF THE DISCLOSURE

The present disclosure relates to systems and methods for connecting people. More particularly, the present disclosure relates to computer implemented connection systems and methods that require physical proximity when establishing a connection between users thereof.

SUMMARY

A connection system, such as a social network, may have a plurality of users. A user of the connection system may establish connections with other users of the connection system, thereby forming a user network comprised of their connected users. A user may interact with one or more of their connected users on their user network. A user may build a user network by establishing one or more user connections to users with whom interaction and association may benefit them in their business, work, or professional endeavors. Such a user network may be called a professional network. A user may build a user network by establishing one or more user connections to acquaintances, family members, friends, and the like. Such a user network may be called a social network. In some implementations, a user of the connection system may be one or more of a person, a member, an administrator, a business represented by an administrator, a group represented by an administrator, or the like, and be associated with a user account comprised by the connection system. In some implementations, a user account may be configured to comprise a user profile and a user network comprising one or more connections to other users of the connection system. In some implementations, an administrator user account may be configured to comprise one or more user networks comprising one or more connections to other users of the connection system. For example, an administrator for a group sponsor, event planning service or the like may establish a different user network for each of a plurality of groups serviced thereby. In some implementations, two connected users are connected to each other's user network and can see other connected users (also referred to connections) within the other's user network.

Physical Proximity Requirement

A connection system of the present invention requires a physical proximity requirement between two users be satisfied prior to facilitating a connection between the two users and may be called a proximity-locked connection system. Such a physical proximity prerequisite or requirement (which may also be referred to as a connection proximity requirement) to establishing a connection may improve overall connection quality of a user network by reducing the pool of candidate connections to only those where a mutual interest in a connection is sufficiently high enough or the course of activities, such as meetings, lunch dates, etc., is such that a physical proximity between users (and user devices thereof) may be accommodated and/or arranged. Furthermore, a physical proximity requirement to facilitating a connection creates an environment that facilitates trusted connections among users due to a requirement of a meeting, engagement, rendezvous, or the like, which results in the physical proximity requirement being satisfied. Such a "face-to-face" encounter may yield a meeting of the two users prior to creating a connection therebetween, which may reduce or eliminate anonymity and permit vetting of a user's identity prior to accepting a connection therewith. Lack of anonymity and vetting of users' identities may result in connections that are trusted, and thereby improve the overall quality of user connections within the proximity-locked connection system. A user may access a proximity-locked connection system using a user computing device (user device), such as a smartphone, smartwatch, tablet, laptop and the like. A proximity-locked connection system may facilitate a connection between two users provided that user devices associated with the two users satisfy a physical proximity requirement. In some implementations, two user devices having a distance between them not greater than a predetermined maximum distance, which may be called a predetermined connection proximity threshold (which may be referred to as a predetermined proximity threshold or a predetermined connection threshold, or more briefly as a proximity threshold or a connection threshold) may satisfy a physical proximity requirement. A determination of a distance between two user devices may be referred to as a user proximity determination or a proximity determination. Note that "proximity" means "physical proximity" (i.e., "nearness in space") herein, unless another meaning or type of proximity is explicitly stated or apparent from context.

Proximity Determinations

In some implementations, a proximity determination may be based on positioning data (which may also be referred to as location data), wherein such positioning data may represent a location of a user device and may represent a location of a user of the user device. In some implementations, positioning data may represent a location on earth. For example, positioning data may be global positioning system data, such as Global Positioning System (GPS) coordinate data as may be output by a GPS module of a user device, wherein the coordinate data identifies a geographical location, which may also be referred to as a geolocation and such global positioning data may be referred to as geolocation data, wherein geolocation data may represent a location on earth, may be expressed as a latitude coordinate value and a longitude coordinate value, and in some implementations, geolocation data may comprise an altitude value (or elevation value), wherein such an altitude or elevation value may be relative to sea level.

In some implementations, positioning data may be localized positioning data, such as may originate (e.g., be determined by and output by) a Bluetooth beacon-based location service, wireless triangulation-based location service, or the like, and may be reported (transmitted) by a user device to a server of the proximity—locked connection system. In some implementations, localized positioning data may be represented or may be expressed relative to a local point of origin and may be called relative location data. In some implementations, location data may be cartesian coordinate data (e.g., X axis, Y axis), relative to a point of origin. In some implementations, location data may comprise altitude or Z axis data relative to a point of origin. Other suitable coordinate systems may be used to express a location, such as a location of a user device, such as for example, a polar coordinate system.

In some implementations, a first user device and a second user device may report (transmit) to a server of the connection system a first location and a second location, respectively, specified by first positioning data and second positioning data, respectively, from which a distance between the reported first positioning data and the reported second positioning data may be determined, and if the determined distance (which may be called a proximity determination), is within a connection threshold, the proximity-locked connection system may facilitate a connection between the two users associated with the two user devices. If the proximity determination is not within the connection threshold, the proximity-locked connection system may not facilitate a connection between the two users associated with the two user devices. In some implementations, a connection threshold may be 6 feet, which may encompass typical distances experienced by two users engaged in conversation while standing at a networking event or seated across from each other at a restaurant. In some implementations, other suitable threshold distances may be used, such as 3 feet, 7 feet, 1 meter, 2 meters, or the like. In some implementations, two users each having a user device having reported a location by transmitting location data associated therewith to a server of a proximity locked connection system may be considered to be within a connection threshold when the server calculates a distance between the two reported locations (which may be called a reported distance) and determines that the reported distance is equal to or less than the connection threshold. In some implementations, a reported distance may be required to be less than the connection threshold (i.e., equal to is not considered "within"). Implementations where the reported distance is within a connection threshold when equal thereto, and implementations where the reported distance is not within a connection threshold when equal thereto are both within the scope of the present invention.

In some implementations, wireless connectivity properties may be used to infer, measure, or estimate a distance (make a proximity determination) between two user devices. For example, a "tap" initiated Near Field Communications (NFC) link between two user devices may be used to infer a range of distance of approximately zero to several feet. In some implementations, an NFC link between two user devices may be used to assign a predetermined reported distance between the two user devices for use in determining if a reported distance is within a connection threshold. In some implementations, an NFC link between two user devices may satisfy a connection proximity requirement.

In some implementations, an image presented on one user device and captured and "read" by another user device may be used to infer, measure, or estimate a distance or a range of distance (make a proximity determination) between the user devices based on attributes of the displayed image and attributes of the captured image and attributes of the display and attributes of the camera of the displaying user device and the capturing user device, respectively. In some implementations, an intermediary device having a first wireless communications link with a first user device and having a second wireless communications link with a second user device, may be used to infer, measure, or estimate a distance between (make a proximity determination) the first user device and the second user device based on wireless connectivity properties of the first wireless communications link and wireless connectivity properties of the second wireless communications link.

In some implementations, an image presented on an intermediary device in paper/print, electronic display, etc., and captured and read by each of a first user device and a second user device may be used to infer, measure, or estimate a range of distance (make a proximity determination) between the first user device and the second user device based on attributes of the displayed image, attributes of the captured images and attributes of the camera of the first user device and attributes of the camera of the second user device.

A plurality of methods for making a proximity determination are given above. It will be apparent to those skilled in the art that additional implementations and methods may be used to make a proximity determination. Such additional implementations and methods are within the scope of the appended claims.

User Connections

In some implementations, a user connection between a first user and a second user is only established when a proximity determination between a first user device of the first user and a second user device of the second user is within a connection threshold and the first user and the second user mutually accept the creation of the connection. Following the creation of connection between the two users, the first user is part of the second user's user network and the second user is part of the first user's user network, and in some implementations, the two users being connected to each other's user network may enable them to see other connected users within the other's user network, wherein such other connected users may be referred to a second level (or second tier, or second degree, etc.) connections, and those connection users (or connections) within their own user network may be referred to as first level (or first tier, or first degree, etc.) connections. In some implementations, a user may have differing levels of access and visibility to a connection (e.g., differing abilities to communicate and interact with the connection, access to different portions of the connection's profile, differing access to postings and writings by the connection, differing rules for notifications upon postings or other communications made by the connection, and the like, based on the level of connection (first level or second level) with the connection.

Quick Connect

In some implementations, a quick connect feature may facilitate two users, such as a first user and a second user, who may already be engaged in face-to-face discussion (e.g., talking in a meeting, making introductions at a reception, chatting at a restaurant, etc.) to quickly form a connection. In some implementations, a quick response code (QR code) image may be displayed on a first user device, wherein a scanning/reading of the QR code by a second user device may satisfy a proximity requirement by inferring a maximum proximity determination through the reading by the second user device of the QR code displayed by the first user device (e.g., the first user device and the second user device are close enough—within a maximum distance—to each other for a camera system of the second user device to resolve sufficient detail for reading the QR code displayed by the first user device), wherein the inferred maximum proximity determination is within a connection threshold. In some implementations, the QR code may comprise an internet address, such as a uniform resource locator (URL) or internet protocol (IP) address, assigned to the connection system, which directs the second user device thereto. In some implementations, the QR code may be generated by a server of the connection system in response to a request by the first user device to establish a connection. As such, acceptance of the connection by the first user may be implied through the first user's requesting of the QR code, and a scanning by the second user device of the QR code may be used to infer an acceptance of the connection by the second user, thereby resulting in a mutual acceptance of the connection.

A QR code as described above may be used to satisfy a connection proximity requirement and indicate mutual acceptance of a connection. Such a QR code may be called a quick connect code, and a request initiating a generation of the quick connect code may be called a quick connect request. In some implementations, a quick connect code generated by the server of the connection system in response to a quick connect request received from a first user device may comprise an internet address of a server of a proximity-locked connection system and a unique coding (unique code, embedded token or the like), wherein a second user device may scan and process the internet address comprised by the quick connect code which facilitates a communication of the unique coding to the server, thereby confirming to the server that the second user device with which it is now in communication is the user device of the user to which the first user wishes to connect, i.e., the second user device. In some implementations, if a server of the connection system determines that the second user device is not associated with a user of the connection system (e.g., there is no user account associated with the second user device), then the server may send a prompt to the user of the second user device to become a user of the connection system and prompt for a download of a user device application useable to interact with the connection system, following which the second user may complete an enrollment in the system upon which a server of the connection system may create a connection between the first user and second user (due at least in part to the aforementioned quick connect process having satisfied a connection proximity requirement and having generated a mutual acceptance of the connection). Should the second user already be a user of the connection system, a server of the connection system may create a connection upon receipt of a valid unique coding (wherein a valid coding is a code, embedded token or the like read by the second user device that matches the unique coding generated by the server in response to the first user's quick connect request) comprised by the quick connect code. In some implementations, use of a quick connect code may be limited to a time window, such as 1 minute, 5 minutes, 30 seconds, or the like, where the time window allows for a first user and second user to complete the process of presenting and reading the quick connect code, and where the time window is not met, a requesting of another quick connect code may be required in order to reattempt a quick connection.

Candidate Connections

In some implementations, a proximity-locked connection system may include services which facilitate identification, presentation and selection of potential connections, which may also be referred to as candidate connections.

Proximity Based Candidate Connections

In some implementations, a proximity-locked connection system may comprise a proximity assessment feature, wherein a user may be identified as a candidate connection for a given user based at least in part on a user device of the candidate connection being located within a predetermined evaluation threshold distance (which may also be referred to as an evaluation threshold) from a given user device of the given user. In some implementations, one or more such candidate connections may be identified and presented to the given user via the given user device for consideration of a possible one or more connections therewith. In some implementations, a presentation of a candidate connection to a given user may comprise a portion of the candidate user's user profile (or more simply referred to as candidate user profile) which may be restricted to the name portion of the candidate user profile, i.e., the name of the candidate user. Revealing only the name of the candidate user may improve aspects of user privacy related to other portions of the candidate user profile which are not presented, while also reducing anonymity by presenting the name of the candidate user. In some implementations, a name of the candidate user is presented as a notification displayed on a user device receiving the notification. In some implementations a user may access a display screen of a proximity-locked connection system application running on their user device which shows a list of candidate connections which are nearby and have a user device within an evaluation threshold of the user device being accessed. In some implementations, the list is presented in order of closest to farthest distance. In some implementations, the list is presented in decreasing order of similar content between the user profile (of the user receiving the presented candidate users) and the candidate user profiles (or some other function, such as in order of a decreasing probability of yielding a connection, wherein in some implementations, probability of yielding a connection may be estimated based on a machine learning modeling for the probability of yielding a connection based on user profile data, user network data and the like). In some implementations, a user may display a screen within a proximity-locked connection system application running on their user device which shows positions of candidate connections relative to the user's position in a graphical from, e.g., map form, wherein in some implementations, the user may select an icon representation of a candidate connection comprised by the display screen and access at least a name portion of the user associated with the selected candidate connection. Such presentations, lists and maps of candidate connections may facilitate a user's identification and selection of candidate connections which may be within an evaluation threshold therewith.

In some implementations, a presentation of a candidate connection may comprise an image of the associated user (e.g., a headshot) or a name and image of the user associated with the candidate connection, wherein the presentation of the image may facilitate a user receiving the image in the identification and selection of a candidate connection which may be in an evaluation proximity therewith. For example, a user may be at a networking event, e.g., a reception at a conference, and receive a plurality of candidate connections presented on their user device. Scanning the notifications, they may notice a name of someone with whom they are at least partially acquainted, but not currently connected with, or in implementations where an image of the user may be presented, they may recognize the user associated with the image among nearby persons. Upon identifying a candidate connection, a user may attempt to come within a connection threshold thereof and may attempt to further evaluate the merits and potential for reaching a mutual consensus/acceptance to form a connection. In some implementations, a user may enable or disable such presenting of portions of their user profile (which may also be referred to as enabling or disabling a user's visibility) to other users within an evaluation threshold distance therefrom, such that they may control when they may be presented to other users as a candidate connection.

Keyword-Based Candidate Connection

In some implementations, a keyword-based search feature may be provided such that a user may attempt to locate candidate connections with users having certain skills, credentials, work experience and the like by searching with keywords associated therewith. In some implementations, in response to keyword search by a user, the user may be presented with a keyword-based candidate connection and may be presented with at least a portion of the user profile associated with the candidate connection, wherein presented profile portion or portions may be suitable for the user presented therewith to evaluate the merits of a potential connection with the user associated with the candidate connection. Users wishing to increase their visibility and exposure within a proximity-locked connection system may associate their account (and thereby themselves) with keywords relating to their skills, credentials, work experience and the like. In some implementations, such keywords may be purchased keywords or bidded keywords, such as may be similar to that for a Google Ads AdWords keyword-based cost-per-impression campaign, but for candidate connection impressions rather than ad impressions. In some implementations, where a plurality of users may be bidding on a keyword, one or more of the plurality of users may be presented to a given user in response to a search on the keyword by the given user, wherein such presentation may be as candidate connections in descending order of their associated bid amounts. In some implementations, only the user bidding the highest amount is presented as a candidate connection. In some implementations, up to five of the highest bidding users may be presented, or some other suitable number of bidding users. In some implementations, a presentation of a candidate user to a user in response to a keyword search by the user on a paid or bidded keyword results in a payment made by the presented candidate user in the "paid" amount or amount bid by the candidate user, wherein, in some implementations, such payment may be directed to a provider, operator, agent or the like, of the proximity-locked connection system. In some implementations, such payment may be fulfilled as a debit to a user account balance prepaid to a provider, operator, agent or the like, of the proximity-locked connection system. In some implementations, a user of a user account having an insufficient account balance to cover the user's bid amount for a searched keyword will not be presented as a candidate user in response to the keyword search. In some implementations, a user may set up an automatic funding of their prepaid account balance by a predetermined amount from a predetermined funding source (e.g. a credit card, debit card, checking account, savings account, etc.) in response to their account balance falling below a predetermined amount, such as for example, $10.00, $5.00, $20.00, the highest keyword paid or bid amount associated with their account, a multiple of the highest keyword paid or bid amount associated with their account, or some other suitable amount.

Meeting Facilitation

In some implementations, a proximity-locked connection system may include user services to allow a user to post or communicate terms for another user to arrange a physical meeting therewith. In a proximity-locked connection system, a proximity requirement between two user devices of two users must be satisfied prior to forming a connection therebetween. In some implementations, a proximity-locked connection system may comprise meeting facilitation tools to facilitate a satisfying of the proximity requirement. In some implementations, a user presented with a candidate connection may be presented with information regarding a potential meeting with the user associated with the candidate connection, wherein the user associated with the candidate connection may specify terms relating to meeting therewith (such as for example, cash and/or other forms of compensation, including transportation, venue/menu fees, and the terms and timing of compensation—such as prepayment, partial payment in advance, credit card payment, delivery of tickets or other items, etc.). In some implementations, a user having purchased a keyword or bid a keyword to be presented as a candidate connection in response to a user search on that keyword (as described above), may configure their account to have meeting terms presented, or a link thereto presented, in response to the keyword search. In some implementations, a user may pay a fee, for example a monthly subscription fee in order to be presented as a candidate connection along with meeting terms (or a link thereto) in response to proximity evaluations, wherein the user may specify terms relating to meeting therewith (such as for example, cash and/or other forms of compensation, including transportation, venue/menu fees, and the terms and timing of compensation—such as prepayment, partial payment in advance, credit card payment, delivery of tickets or other items, etc.), and wherein, in response to a proximity evaluation, a presentation as a candidate connection may include meeting terms, or a link thereto may be presented. In some implementations, a candidate connection notification, a list of candidate connections or a graphical representation of relative locations of candidate connections may be displayed on a user device, wherein those candidate connections having meeting terms may be visually distinguished from those not having meeting terms. For example, in some implementations, candidate connections having meeting terms may be displayed with a colored border, star, icon, wording, and/or the like to indicate the candidate connection has meeting terms, such that a user receiving the candidate connection notification, a list of candidate connections or a graphical representation of relative locations of candidate connections displayed on a receiving user device thereof may see if meeting terms are associated with any of the candidate connections, wherein clicking on a presented candidate connection having meeting terms associated therewith may result in a display of such meeting terms.

User Device Emulation

In some implementations, a proximity-locked connection system may provide for emulation of a user device such that a user may configure a user device emulator comprising a time window and a geolocation, such as coordinate data representing the geolocation, a landmark having the geolocation known to the connection system, a previously defined geolocation, etc., wherein the connection system may use the positioning data of the emulated user device as one of two user devices used in a proximity determination. In some implementations, an administrator user account may be configured to comprise one or more user networks comprising one or more connections to other users of the connection system. For example, an administrator for a group sponsor, event planning service or the like may establish a different user network for each of a plurality of groups serviced thereby. For example, a club, such as a chess club may have a chess club user network administered by the administrator. The administrator may configure a user device emulator and assign a time window having a start time corresponding to a start of a chess club member signup drive and an end time corresponding to an end time of the chess club member signup drive, and a geolocation corresponding to the location of the member signup drive, wherein a user wanting to join the chess club may attend the member signup drive (e.g., go to the member signup drive location). When the user arrives at the member signup drive location within the time window, a proximity determination between the user device of the user and the configured geolocation of the emulated user device may satisfy a proximity requirement and, upon mutual acceptance of a connection between the user and the administrator on behalf of the chess club, a connection may be created.

Connection Facilitators

In some implementations, a proximity-locked connection system may support facilitators who may work on behalf of a user to attempt to foster and create a connection with another user. In some implementations, such connection facilitators may have facilitator accounts which may comprise facilitator profiles and may comprise facilitator statistics (such as connections per attempted connections, average time from engagement to connection, and/or the like), user ratings and reviews and the like, wherein a user wanting to engage a facilitator, may review the profiles, statistics, ratings, reviews, etc. to assist in locating a suitable facilitator to foster and create a connection on their behalf. In some implementations, facilitators may facilitate connections for the purpose of introducing and helping to close business relationships and transactions using standard agreements available in the connection system, including confidentiality, non-circumvention, and commission or other agreements regarding payment terms relating to such facilitation.

Connection Refresh

In some implementations, a proximity-locked connection system may require that an established connection be refreshed prior to an expiration of the established connection, wherein to refresh a connection and reset an expiration date thereof, a physical proximity requirement must be met. In some implementations, a physical proximity requirement to refresh a connection may be the same as a physical proximity requirement to establish a connection. In some implementations, a physical proximity requirement to refresh a connection may be different than a physical proximity requirement to establish a connection.

Some Aspects of the Techniques Described Herein

In some aspects, the techniques described herein relate to a system for connecting users, the system including: one or more servers, each server configured to communicate over a communications network; a plurality of user devices, each user device operable by a user of the user device, wherein the user device is configured to communicate over a communications network and interact with the one or more servers, thereby enabling the user of the user device to interact with the one or more servers; and one or more databases accessible by the one or more servers, wherein the one or more databases include: a plurality of user accounts, wherein: a first user account is associated with a first user having a first user device; and a second user account is associated with a second user having a second user device; and a plurality of connections, each connection representing a connection between two users, wherein the one or more servers are further configured to: receive from the first user device a first location of the first user device; receive from the second user device a second location of the second user device; calculate a distance between the first location and the second location; determine that the distance is within a connection threshold; and create a connection between the first user and the second user at least in part due to the distance between the first location and the second location being within the connection threshold.

In some aspects, the techniques described herein relate to a system, wherein the database further includes a plurality of user networks, associated with the user accounts, wherein upon creation of the connection between the first user and the second user: the first user account has a first user network including a connection to the second user; and the second user account has a second user network including a connection to the first user.

In some aspects, the techniques described herein relate to a system, wherein the first location and the second location are geolocations.

In some aspects, the techniques described herein relate to a system, wherein the first location and the second location are localized relative to a local point of origin.

In some aspects, the techniques described herein relate to a system, wherein the first location and the second location originate from a Bluetooth beacon-based location service.

In some aspects, the techniques described herein relate to a system, wherein the first location and the second location originate from a wireless triangulation-based location service.

In some aspects, the techniques described herein relate to a system, wherein a connection expiration date or connection expiration timer is configured in conjunction with creation of the connection between the first user and the second user, wherein upon the connection expiration date or by end of the connection expiration date, or upon expiration of the connection expiration timer, the connection between the first user and the second user is deleted.

In some aspects, the techniques described herein relate to a system, wherein the one or more servers are further configured to: receive from a third user device a third location of the third user device; receive from a fourth user device a fourth location of the fourth user device; calculate a distance between the third location and the fourth location; determine that the distance is within an evaluation threshold; facilitate a display of a candidate connection with the fourth user on the third user device due at least in part to the distance between the third location and the fourth location being within an evaluation threshold; and facilitate a display of a candidate connection with the third user on the fourth user device due at least in part to the distance between the third location and the fourth location being within an evaluation threshold.

In some aspects, the techniques described herein relate to a system, wherein the candidate connection with the fourth user is displayed on the third user device in a map-like representation.

In some aspects, the techniques described herein relate to a system, wherein the candidate connection with the fourth user is displayed on the third user device in a list of one or more candidate connections.

In some aspects, the techniques described herein relate to a system, wherein the one or more servers are further configured to: receive from a fifth user device a fifth location of the fifth user device; calculate a distance between the fifth location and the fourth location; determine that the distance is within a connection threshold; facilitate a display of a connection opportunity with the fourth user on the fifth user device due at least in part to the distance between the fifth location and the fourth location being within a connection threshold; and facilitate a display of a connection opportunity with the fifth user on the fourth user device due at least in part to the distance between the fifth location and the fourth location being within a connection threshold.

In some aspects, the techniques described herein relate to a system, wherein the connection opportunity with the fourth user is displayed on the fifth user device in a map-like representation.

In some aspects, the techniques described herein relate to a system, wherein the connection opportunity with the fourth user is displayed on the fifth user device in a list of one or more connection opportunities.

In some aspects, the techniques described herein relate to a system, wherein upon a selection by a fifth user of the connection opportunity displayed on the fifth user device, the one or more servers are further configured to facilitate a display of a connection confirmation display screen on the fifth user device, wherein the fifth user may indicate an acceptance of the connection opportunity to connect with a fourth user.

In some aspects, the techniques described herein relate to a system, wherein upon a selection by the fourth user of the connection opportunity displayed on the fourth user device, the one or more servers are further configured to: receive an acceptance of the connection opportunity displayed on the fifth user device; facilitate a display of a connection confirmation display screen on the fourth user device; receive an acceptance of the connection opportunity display on the fourth user device; and create a connection at least in part due to a mutual acceptance of the connection opportunity displayed on the fourth user device and the connection opportunity displayed on the fifth user device.

In some aspects, the techniques described herein relate to a system, wherein both the candidate connection with the third user and the connection opportunity with the fifth user are displayed on the fourth user device in a map-like representation.

A detailed disclosure of various example implementations which may relate to one or more aspects of the foregoing summary disclosure is provided following a brief description of the drawings.

BRIEF DESCRIPTION OF THE DRAWINGS

The accompanying drawings, which are included to provide a further understanding of the disclosed subject matter, are incorporated in, and constitute a part of this specification. The drawings also illustrate example implementations of the disclosed subject matter and together with the detailed description serve to explain the principles of the disclosed subject matter.

DETAILED DESCRIPTION

Figure 1:
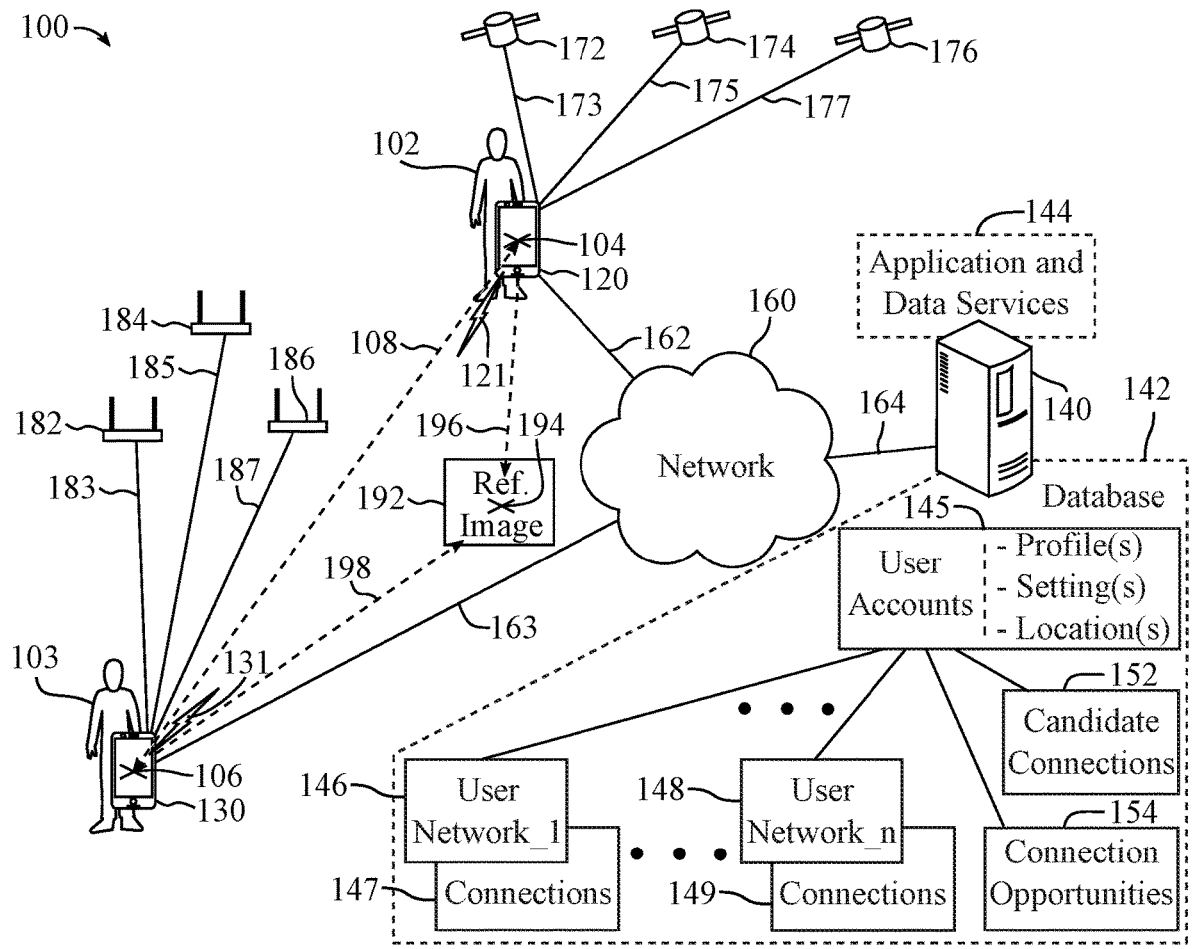
FIG. 1 depicts a system diagram of an example implementation of a connection system of the present disclosure.

Various detailed example implementations of systems and methods that require physical proximity for establishing a connection and/or maintaining a connection between users of a connection system (e.g., a social network) are disclosed herein; however, it is to be understood that the disclosed implementations are merely illustrative and may be embodied in various forms. In addition, each of the examples given in connection with the various implementations is intended to be illustrative, and not restrictive.

The following detailed example implementations refer to the accompanying drawings. The same reference number may appear in multiple drawings and when appearing in multiple drawings will identify the same or similar elements. For brevity, a reference number and its referenced element will be disclosed in accompanying text herein and generally in relation to a first appearance in the drawings but may not be explicitly referred to in accompanying text again when appearing in subsequent drawings.

Systems and methods that require physical proximity for establishing a connection and/or maintaining a connection (which may be referred to as a proximity-locked connection system) between users thereof may comprise a plurality of user accounts and a server based application services system that may be in communication with a plurality of user devices, such as smartphones, which may comprise a connection application for interacting with the connection system and method and/or may access a connection application comprised by the connection system, thereby providing access to user accounts by users via user devices. In some implementations, a user of the connection system may be one or more of a person, a member, an administrator, a business represented by an administrator, a group represented by an administrator, or the like, and be associated with a user account represented by account data comprised by a database of the connection system. In some implementations, a user account may be configured to be associated with a user network comprising one or more connections to other users of the connection system. In some implementations, an administrator user account may be configured to comprise one or more user networks comprising one or more connections to other users of the connection system. For example, an administrator for a group sponsor, event planning service or the like may establish a different user network for each of a plurality of groups serviced thereby.

FIG. 1 depicts a system diagram of an example implementation of a connection system 100, wherein connection system 100 may be a proximity-locked connection system and may be accessed by users, such as user 102 and user 103, via user devices, such as user device 120 and user device 130, respectively, to build and maintain user networks. Connection system 100 may comprise a server 140, application and data services 144 and a database 142, wherein server 140 may be one or more servers located in one or more locations and may be cloud based, and database 142 may be one or more databases located in one or more locations and may be cloud based. Applications and data services may comprise software modules comprising program code which when executed by one or more processors of server 140 may facilitate users of connection system 100 in forming connections and build user networks comprised by database 142. Database 142 may comprise a plurality of users having user accounts 145 (which may comprise user profiles, account settings, reported user device locations), wherein a given user account of a given user comprised by user accounts 145 may be associated with one or more user networks of other users with which the user has formed a connection, such as one or more of user network_1 146 through user network_n 148, comprising user network_1 connections 147 through user network_n connections 149, respectively, wherein a user network of a user, such as the given user, is the set of users to which the given user is connected, wherein the given user may be considered to also be within their own network as the owner (or administrator). For example, a user, such as user 103, may establish a user account comprised in user accounts 145 of database 142, and may form a user network, such as user network_1 146, by establishing a plurality of connections, such as connections 147 in user network_1 146, wherein user 103 is the owner of user network_1 146 and has a plurality of connections to a set of other users (comprised in connections 147) having an associated set of user networks among user network_2 through user network_n 148, in each of which user 103 appears in the connections thereof. As will be apparent to those skilled in the art, there are many ways to configure database 142 and store connections therein. For example, in some implementations, a database table may record all connections, (e.g., a connections table), wherein each record therein may comprise a first foreign key for a first user ID (a unique ID associated with a first user/user account) of a first user of a connected pair of users, and second foreign key for a second user ID (a unique ID associated with a second user/user account) of a second user of a connected pair of users. In such implementations of a connections table, a given user network may be assessed by a database query for all connection records comprising the given user's unique user ID in either the first user ID or second user ID foreign key. Note that the first user and second user assignment in a connected pair of users is arbitrary with respect to the existence of a connection between the two users of the pair, however it may be used to indicate which of the two users of the connection accepted the connection first by assigning that user the first user foreign key field in the connection record. In some implementations a user that is an administrator, may administer more than one user network, e.g., they may have/own more than one user network such as a user network for a chess club and a user network for a book club. In some implementations, each user network of an administrator account may have a unique user ID associated therewith, wherein in some implementations a connections database table may comprise all connections within a connection system and a given user network comprised by user network comprised by an administrator account may be assessed by a database query for all connection records comprising the unique user ID associated with the given user network in either the first user ID or second user ID foreign key field of the records of the connections table. In some implementations, database 142 may comprise candidate connections 152 and connection opportunities 154, which may comprise pairs of users where a pair of users may be within an evaluation threshold of each other and a pair of users may be within a connection threshold of each other, respectively.

User device 120 and user device 130 may communicate with server 140 over communications network 160 which, in some implementations, may include wired and wireless communications links. For example, user device 120 may communicate with server 140 over communications link 162 and communications link 164, wherein communications link 162 may be a wireless communications link, such as a cellular communications link or a WiFi link (such as may be compatible with the IEEE 802.11 standard for wireless networks) to communications network 160 and communications link 164 may be a wired communications link to communications network 160, such as a physical/wired Ethernet link (such as may be compatible with the IEEE 802.03 standard for physical and data-link layer specifications for Ethernet). User device 130 may communicate with server 140 over communications link 163, communications network 160 and communications link 164. It should be apparent to those skilled in the art that many network configurations and topologies are possible which may enable communications between user device 120 and server 140, and between user device 130 and server 140. User device 120 may have a short-range communications link 121, such as a Bluetooth communications link or a near field communications (NFC) link. User device 130 may have a short-range communications link 131, such as a Bluetooth communications link or a near field communications (NFC) link.

Geo Navigational Satellite Systems (GNSS) satellites 172, 174 and 176 are depicted as transmitting GNSS signal data to user device 120 over links 173, 175 and 177, wherein user device 120 may comprise a GNSS module configured to derive a geolocation therefrom. Similarly, user device 130 may receive GNSS signal data, however for the purposes of illustrating an alternative implementation for determining a location of a user device, user device 130 is depicted as receiving signals from wireless access points 182, 184, and 186 over wireless links 183, 185 and 187, respectively, wherein a triangulation of signal data, such as round trip transmission time between user device 130 and access points 182, 184, and 186 may be used in conjunction with known physical locations for access points 182, 184, and 186 to triangulate a geolocation for user device 130. It should be noted that fewer or more access points may be used, e.g. two or four access points, and that use of two such access points may yield a lesser degree of positional accuracy than use of three access points, which may yield a lesser degree of positional accuracy than use of four such access points. It should be noted that more than three GNSS satellites may be used which may yield a higher degree of positional accuracy than three such GNSS satellites. Geolocation data available to user device 120 and geolocation data available to user device 130 may be communicated to server 140, wherein, in a proximity determination, server 140 may calculate a distance 108 between the location 104 of user device 120 and location 106 of user device 130. Distance 108 may be used in a connection threshold test to determine if a proximity requirement for establishing a connection has been met, namely, to determine if the distance between user 102 and user 103 is within a connection threshold.

FIG. 1 also depicts an image based proximity determination, wherein a reference image 192 having a location of 194 may be scanned using a camera of user device 120 and a camera of user device 130, wherein the resulting captured images and camera meta data may be used to calculate a distance, such as distance 196 and distance 198, and relative viewing angles between both user device 120 and user device 130 and reference image 192 such that the distance 108 may be calculated in a proximity determination.

Figure 2:
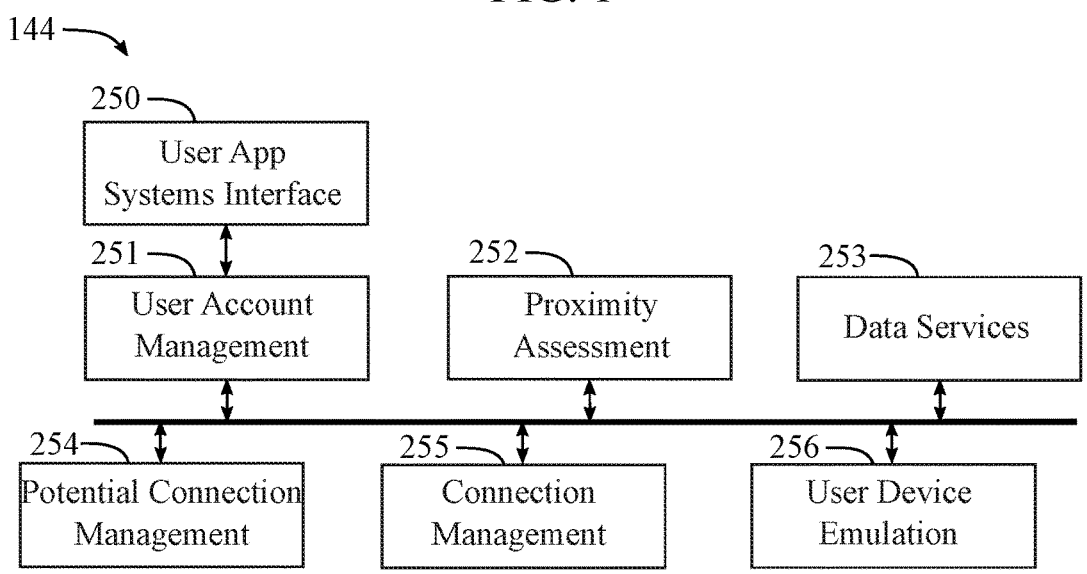
FIG. 2 depicts a software module block diagram of an example implementation of application and data services.

FIG. 2 depicts a software module block diagram of an example implementation of application and data services 144, wherein a user app systems interface module 250 may interface to a connections application running on user devices and connect user device applications to user account module 251. Proximity assessment module 252 may make proximity determinations for a pair of user devices, such as user device 120 and user device 130, wherein location data received therefrom may be used to calculate a distance therebetween. In some implementations, proximity assessment module 252 may continuously process reported user/user device locations which may be comprised by user accounts 145 and make proximity determinations based thereon. Data services module 253 may provide data services for application access to database 142. Potential connection management module 254 may review proximity determinations processed by proximity assessment module 252 for potential connections where a distance between user devices is within an evaluation threshold for candidate connections, a connection threshold proximity requirement has been met for a connection opportunity, or results from a keyword based search for candidate connections, and in some implementations, determine based on selection criteria which candidate connections and connection opportunities to present to associated user devices (and thereby to the associated users). In some implementations, proximity assessment module may continuously update candidate connections 152 and connection opportunities 154 based at least in part on proximity determinations processed by proximity assessment module 252. Connection management module 255 may present connection opportunities to the associated users of the connection opportunities, wherein if a mutual interest in a connection is received from each of a pair of users of a connection opportunity, connection management module may then establish (create) the connection within database 142 in the associated connections of a user network, such as connections 147, connections 149 and/or, in some implementations, a connections table comprising all connections comprised by connection system 100 and indexable by a pair of foreign keys, wherein the pair of foreign keys are unique user IDs. In some implementations, a user device emulation module 256 may allow a user, such as an administrator of a group, e.g. a chess club, book club, professional group, and the like, to emulate a user device associated with the group such that a geolocation can be provisioned for specified times and a user have a user device seeking to connect with a club can attempt to satisfy a proximity requirement between their user device geolocation and the provisioned geolocation of the emulated user device.

Figure 3:
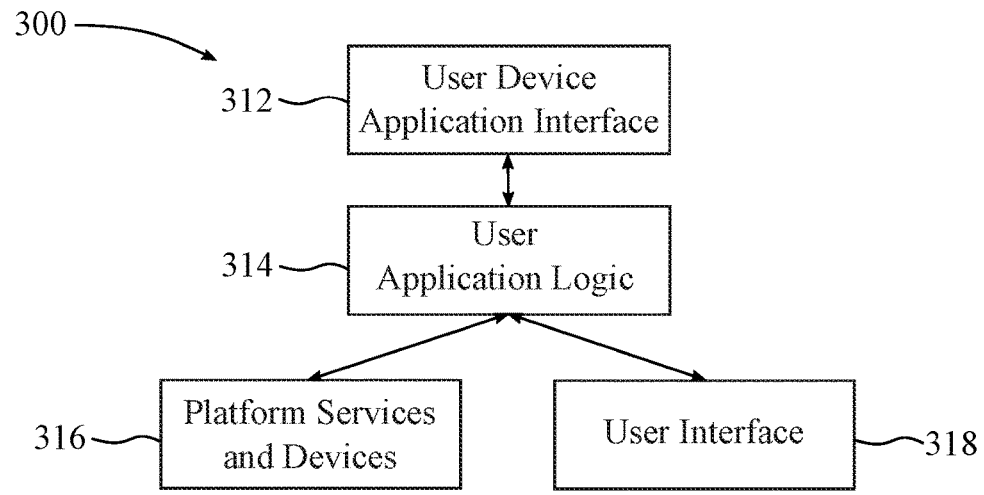
FIG. 3 depicts a block diagram of an example user device.

FIG. 3 depicts a user device block diagram 300 of one of many possible ways to implement, organize and illustrate interfaces, application logic (such as software instructions and/or program code executed by at least one processor of a user device such as user device 120), platform services and devices that may reside on a user device, such as user device 120 and user device 130. User application logic 314 may comprise software instructions and/or program code of a downloadable user software application which may be provided for such download by proximity-locked connection system 100. Also referring to FIG. 1 and FIG. 2, user application logic 314 may provide for management and control of a user interaction with a user device and a user account of user accounts 145 comprised by proximity-locked connection system 100 via user device application interface 312 which may be connected to user app systems interface module 250 of application and data services 144. In some implementations, user application logic 314 may control user interface 318 to display information, such as for example, a user account display screen, a menu of available user operations display screen, a user profile display screen, a user network connections display screen, a candidate connections display screen, a connection opportunities display screen, an accept/create connection display screen, a keyword search screen, an account funding source display screen, and the like. User application logic 314 may receive user input from user interface 318, such as for example, a user account entry or edit, a selection from a menu of available user operations, a user profile entry or edit, a selection of a view user profile of a (existing) network connection, a message entry for messaging to a network connection, input of a keyword in a keyword-based user profile search, selection of a selectable candidate connection notification, a selection of a connection opportunity, a selection of an accept connection prompt, input of a credit card or other account funding/payment source, and the like. User application logic 314 may access platform services and devices 316 to interact with a plurality of platform services and devices 316 of a user device, such as, computing resources, data storage and access resources, device communications including wireless such as wireless LAN, Bluetooth and NFC and the like, geolocation services, voice communications, text communications, audio speakers/headphones, sensors, a camera, image/video communications, and the like. While the block diagram 300 of FIG. 3 may be typically illustrative of a smartphone user device, various user devices capable of real time interaction with a device user, and communication over communications network may be used to permit a user to interact with proximity-locked connection system 100, such as smartphones, tablets, smartwatches, notebooks, computers and other computing devices. In some implementations, user interaction with connection system 100 may be at least in part audio interactions, wherein voice recognition and voice response systems may be comprised by proximity-locked connection system server 140 and/or a user device, such as user device 120 or user device 130.

Figure 4:
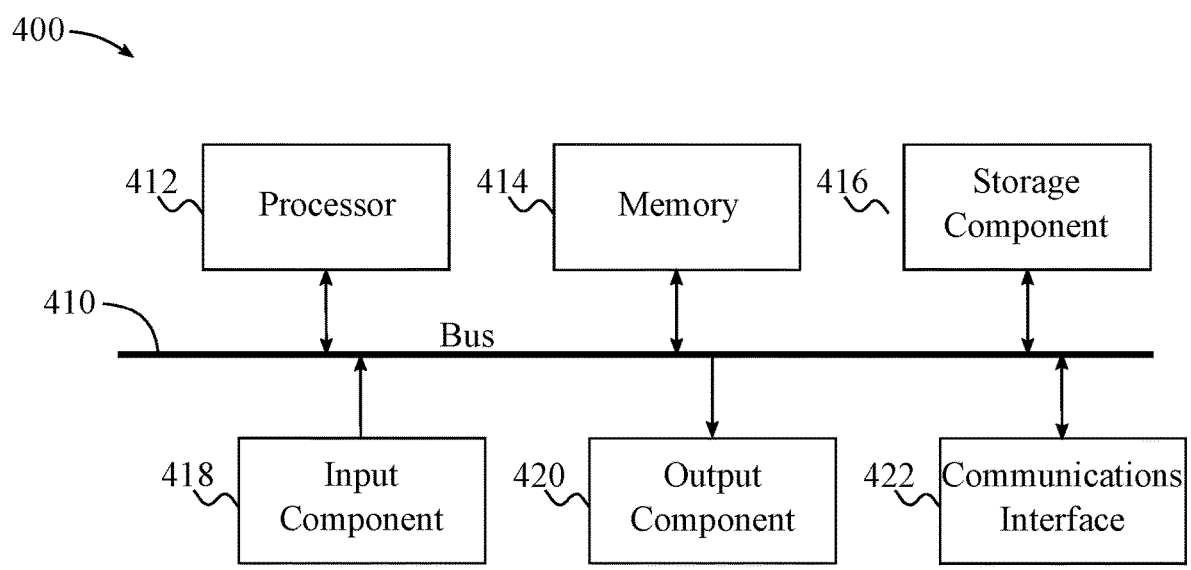
FIG. 4 depicts an example block diagram of components of a device which may correspond to a user device or other device, such as a server.

FIG. 4 is an example block diagram of example components of a device 400, wherein device 400 may correspond to user devices (e.g., user device 120, user device 130, etc.) or other devices (e.g., server 140), which may enable users to interact with application and data services 144 of proximity-locked connection system 100. Device 400 may correspond to one or more devices comprised by proximity-locked connection system 100, such as one or more servers thereof and in some implementations, may correspond to one or more devices comprised by a cloud-based system comprising application and data services 144 and server 140, in part or in whole. In some implementations, a device of proximity-locked connection system 100, such as user device 120, user device 130 and server 140 may include one or more devices 400 and/or one or more components of device 400.

Bus 410 includes a component that permits communication among the components of device 400. Processor 412 may be implemented in hardware, firmware, or a combination of hardware and firmware. Processor 412 may include a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 412 includes one or more processors capable of being programmed to perform a function. Memory 414 includes a random access memory (RAM), a read only memory (ROM), and/or another type of dynamic or static storage device (e.g., a flash memory, a magnetic memory, and/or an optical memory) that stores information and/or instructions for use by processor 412.

Storage component 416 stores information and/or software related to the operation and use of device 400. For example, storage component 416 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 418 includes a component that permits device 400 to receive information, such as via user input (e.g., a touch screen display, a keyboard, a keypad, a mouse, a button, a switch, and/or a microphone). Additionally, or alternatively, input component 418 may include a sensor for sensing information (e.g., a global positioning system (GPS) component, an accelerometer, a gyroscope, and/or an actuator). Output component 420 includes a component that provides output information from device 400 (e.g., a display, a speaker, and/or one or more light-emitting diodes (LEDs)).

Communication interface 422 includes a transceiver-like component (e.g., a transceiver and/or a separate receiver and transmitter) that enables device 10 to communicate with other devices, such as via a wired connection, a wireless connection, or a combination of wired and wireless connections. Communication interface 422 may permit device 10 to receive information from another device and/or provide information to another device. For example, communication interface 422 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 412 executing software instructions stored by a non-transitory computer-readable medium, such as memory 414 and/or storage component 416. A computer-readable medium is defined herein as a non-transitory memory device. A memory device includes memory space within a single physical storage device or memory space spread across multiple physical storage devices. In some implementations, a memory device may be cloud-based, partially cloud-based, or not cloud-based.

Software instructions may be read into memory 414 and/or storage component 416 from another computer-readable medium or from another device via communication interface 422. When executed, software instructions stored in memory 414 and/or storage component 416 may cause processor 412 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5A:
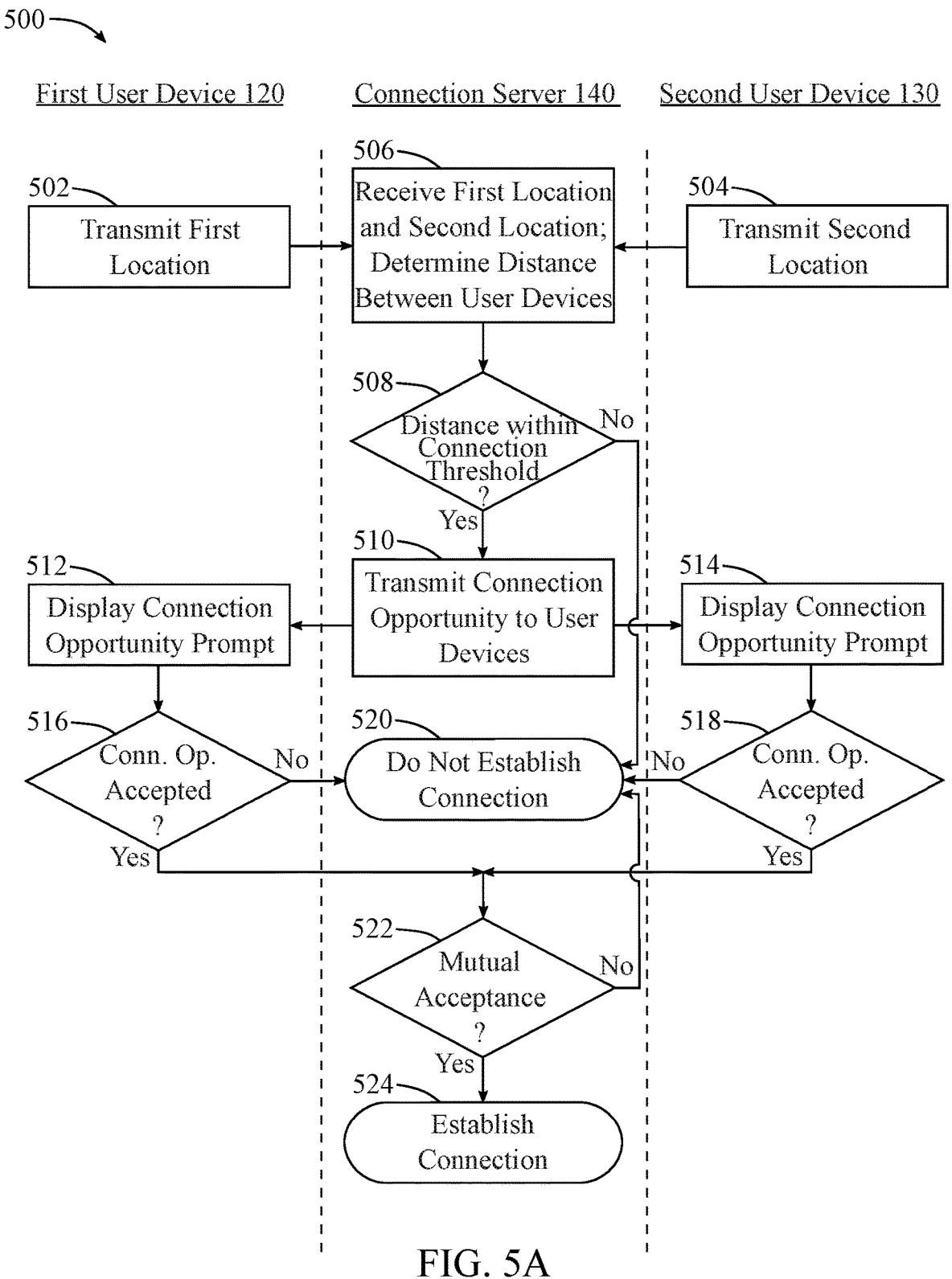
FIG. 5A depicts a flow diagram of an example process for the establishment (or not) of a connection between two users.

FIG. 5A depicts a flow diagram of an example process 500 for the establishment (or not) of a connection (a connection process 500), wherein in block 502 user device 120 (which may be called a first user device and may have a location that is a location of a first user) transmits a first location which is received in block 506 by server 140, which may be called connection server 140, and in block 504 user device 130 (which may be called a second user device and may have a location that is a location of a second user) transmits a second location to server 140, wherein in block 506 server 140 receives the second location and calculates in a proximity determination a distance between first user device 120 and second user device 130. Note that a query (not shown) by server 140 may be made to determine if a connection between a first user associated with first user device 120 and a second user of second user device 130 already exists within connections 147 through connections 149 of database 142 (see FIG. 1), and if a connection already exists therebetween, process 500 may terminate in block 520 without creating another connection between the first user and second user. In some implementations, server 140 having determined an existing connection between the first user and the second user may, in block 508 check if a distance between first user device 120 and second user device 130 that is determined in block 506 is within a connection refresh threshold (instead of the depicted check for a connection threshold). In some implementations, upon a determination by server 140 that two user devices (e.g., first user device 120 and second user device 130) associated with an existing connection between two users (e.g., an existing connection between a first user of first user device 120 and a second user of second user device 130) are within a connection refresh threshold, may in block 510 reset a connection expiration date (or connection expiration timer) associated with the existing connection and which may be stored in connections 147 through connections 149 of database 142 (instead of the depicted transmitting of the connection opportunity in block 510), and may then terminate in block 524 having reset an expiration date (or expiration timer) of an existing connection. In some implementations, upon a determination by server 140 that two user devices (e.g., first user device 120 and second user device 130) associated with an existing connection between two users (e.g., an existing connection between a first user of first user device 120 and a second user of second user device 130) are not within a connection refresh threshold, may then terminate in block 520 having not reset an expiration date (or expiration timer) of an existing connection (instead of the depicted not establishing a connection in block 510). The following discussion of process 500 FIG. 5A presumes a connection between a first user associated with first user device 120 and a second user of second user device 130 does not already exist within connections 147 through connections 149 of database 142.

In block 508 server 140 checks to see if the proximity determination is within a connection threshold. If it is not, process 500 terminates without establishing a connection in block 520. If the proximity determination is within the connection threshold, process 500 transmits the connection opportunity to user devices 120 and 130 in block 510, which in turn display a connection opportunity prompt to the users of the user devices in blocks 512 and 514, respectively, wherein first user device 120 receives a notification in block 512 that the second user is a connection opportunity, and second user device 130 receives a notification in block 514 that the first user is a connection opportunity. In some implementations, the connection opportunity may first be displayed in a list of one or more connection opportunities (not shown in FIG. 5A), wherein in some implementations, a selection by a user of one of the one or more connection opportunities may then cause a user device to display a connection opportunity prompt (e.g., as shown in blocks 512 and 514) for the selected connection opportunity. In blocks 516 and 518, user device 120 and user device 130, respectively check to see if the connection opportunity was accepted, and if either of user device 120 or 130 reports the offer was not accepted (e.g., it was declined, rejected, no-response received for a period of time exceeding a timeout window, etc.), process 500 terminates without establishing a connection in block 520. If mutual acceptance is received in block 522, process 500 terminates with an established connection (i.e., a connection is created between a first user of first user device 120 and a second user of second user device 130). In some implementations, the first location and the second location in blocks 502 and 504, respectively, may be reported as geolocation data. In some implementations, the first location and the second location in blocks 502 and 504, respectively, may be reported as localized location data, such as relative locations which may be relative to a common origin, such as localized positioning data as may be output by a Bluetooth beacon-based location service, wireless triangulation-based location service, or the like.

Figure 5B:
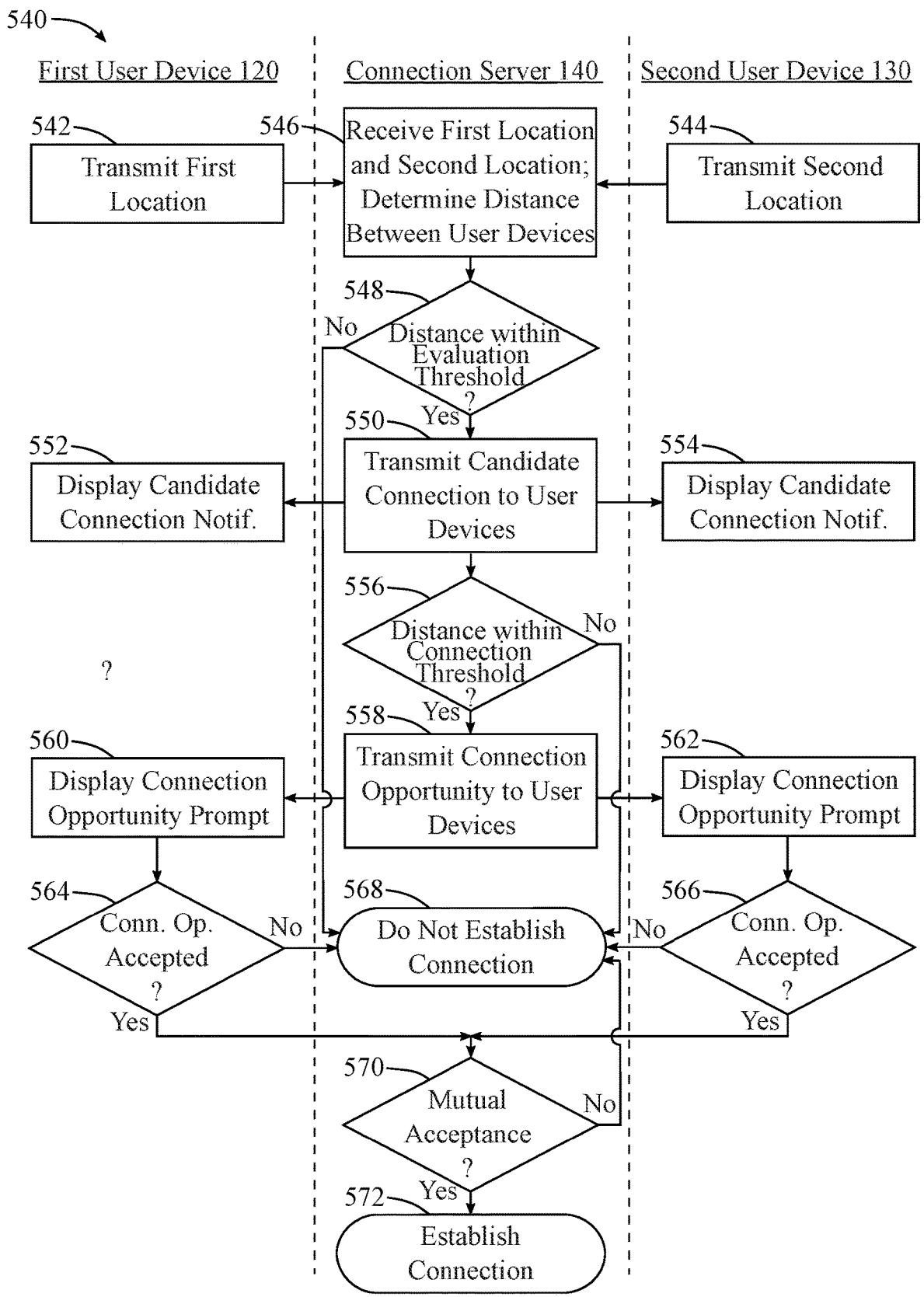
FIG. 5B depicts a flow diagram of an example connection process comprising a proximity evaluation feature.

In some implementations, a proximity-locked connection system may comprise a proximity evaluation feature, wherein a user may receive a candidate connection notification indicating a user is within an evaluation threshold thereof. FIG. 5B depicts a flow diagram of an example connection process 540 comprising a proximity evaluation feature. Process 540 of FIG. 5B and process 500 of FIG. 5A have blocks in common. Process 540 comprises four blocks which are not common with process 500, namely block 548, block 550, block 552 and block 554 which relate to a proximity evaluation feature and a transmitting of a candidate connection determined to be within an evaluation threshold. In the following discussion of process 540, blocks which are common to both process 500 and process 540 are noted by following the block number of process 540 with the block number of process 500 in parentheses. For example, block 542 may be written as block 542 (in process 500, see block 502).

In block 542 (in process 500, see block 502), user device 120 (which may be called a first user device and may have a location that is a location of a first user) transmits a first location which is received in block 546 (in process 500, see block 506) by server 140, which may be called connection server 140, and in block 544 (in process 500, see block 504) user device 130 (which may be called a second user device and may have a location that is a location of a second user) transmits a second location to server 140, wherein server 140 calculates in a proximity determination a distance therebetween. In block 548, server 140 checks to see if the proximity determination is within a predetermined evaluation threshold. If not, process 540 proceeds to block 568 (in process 500, see block 520), wherein process 540 does not establish a connection. Note that a query (not shown) by server 140 may be made to determine if a connection between a first user associated with first user device 120 and a second user of second user device 130 already exists within connections 147 through connections 149 of database 142 (see FIG. 1), and if a connection already exists therebetween, process 540 may terminate in block 548 without creating another connection between the first user and second user. In some implementations, server 140 having determined an existing connection between the first user and the second user may, in block 548 may check if a distance between first user device 120 and second user device 130 that is determined in block 546 is within a connection refresh threshold (instead of the depicted check for an evaluation threshold). In some implementations, upon a determination by server 140 that two user devices (e.g., first user device 120 and second user device 130) associated with an existing connection between two users (e.g., an existing connection between a first user of first user device 120 and a second user of second user device 130) are within a connection refresh threshold, may in block 550 reset a connection expiration date (or connection expiration timer) associated with the existing connection and which may be stored in connections 147 through connections 149 of database 142 (instead of the depicted transmitting of the candidate connection in block 550), and may then terminate in block 572 having reset an expiration date (or expiration timer) of an existing connection. In some implementations, upon a determination by server 140 that two user devices (e.g., first user device 120 and second user device 130) associated with an existing connection between two users (e.g., an existing connection between a first user of first user device 120 and a second user of second user device 130) are not within a connection refresh threshold, may then terminate in block 568 having not reset an expiration date (or expiration timer) of an existing connection (instead of the depicted not establishing a connection in block 568). The following discussion of process 540 FIG. 5B presumes a connection between a first user associated with first user device 120 and a second user of second user device 130 does not already exist within connections 147 through connections 149 of database 142.

If in block 548, the evaluation proximity determination is within a predetermined evaluation threshold, in block 550, server 140 transmits a candidate connection notification to first user device 120 and transmits a candidate connection notification to second user device 130 indicating that the other user is a candidate connection (i.e., first user device 120 receives a notification in block 552 that the second user is a candidate connection, and second user device 130 receives a notification in block 554 that the first user is a connection opportunity). In some implementations, the candidate connection notification may first be displayed in a list or map-like image of one or more candidate connections (not shown in FIG. 5B). In block 552 and block 554, first user device 120 and second user device 130, respectively, display a candidate connection notification, wherein the candidate connection transmitted in block 550 and displayed in block 552 displays at least a portion of a second user profile of a second user of second user device 130, such as a name and/or image of second user of second user device 130 and, wherein the candidate connection transmitted in block 550 and displayed in block 554 displays at least a portion of a first user profile of a first user of first user device 120, such as a name and/or image of a first user of first user device 120. Process 540 may proceed from block 550 to block 556 (in process 500, see block 508), wherein server 140 checks to see if the distance between user devices of block 546 (in process 500, see block 506) is within a connection threshold. If the proximity determination is within a connection threshold, process 540 transmits the connection opportunity to user device 120 and user device 130 in block 558 (in process 500, see block 510), which in turn display a connection opportunity prompt to the users of the user devices in block 560 (in process 500, see block 512) and block 562 (in process 500, see block 514), respectively, wherein first user device 120 receives a notification that the second user is a connection opportunity, and second user device 130 receives a notification that the first user is a connection opportunity. In some implementations, the connection opportunity may first be displayed in a list of one or more connection opportunities (not shown in FIG. 5B), wherein in some implementations, a selection by a user of one of the one or more connection opportunities may then cause a user device to display a connection opportunity prompt (e.g., as shown in blocks 560 and 562) for the selected connection opportunity. If the proximity determination is not within a connection threshold, process 540 terminates without establishing a connection in block 568 (in process 500, see block 520). If the proximity determination is within the connection threshold, process 540 transmits the connection opportunity to user devices 120 and 130 in block 558 (in process 500, see block 510), which in turn display a connection opportunity prompt to the users of the user devices in blocks 560 (in process 500, see block 512) and 562 (in process 500, see block 514), respectively, wherein first user device 120 receives a notification in block 560 that the second user is a connection opportunity, and second user device 130 receives a notification in block 562 that the first user is a connection opportunity. In blocks 564 (in process 500, see block 516) and 566 (in process 500, see block 518), user device 120 and user device 130, respectively check to see if the connection opportunity was accepted, and if either of user device 120 or 130 reports the offer was not accepted (e.g., it was declined, rejected, no-response received for a period of time exceeding a timeout window, etc.), process 540 terminates without establishing a connection in block 568 (in process 500, see block 520). If mutual acceptance is received in block 570 (in process 500, see block 522), process 540 terminates with an established connection (i.e., a connection is created between a first user of first user device 120 and a second user of second user device 130) in block 572 (in process 500, see block 524). In some implementations, the first location and the second location in blocks 542 (in process 500, see block 502) and 544 (in process 500, see block 504), respectively, may be reported as geolocation data. In some implementations, the first location and the second location in blocks 542 (in process 500, see block 502) and 544 (in process 500, see block 504), respectively, may be reported as localized location data, such as relative locations which may be relative to a common origin, such as localized positioning data as may be output by a Bluetooth beacon-based location service, wireless triangulation-based location service, or the like. In some implementations, process 540 may be configured to first check if the distance between the users devices determined in block 546 is within a connection threshold (see block 556). In some implementations, process 540 may check if the distance between the users devices determined in block 546 is within an evaluation threshold (see block 548) only if the distance between the users devices determined in block 546 was first determined to not be within a connection threshold.

Figure 6:
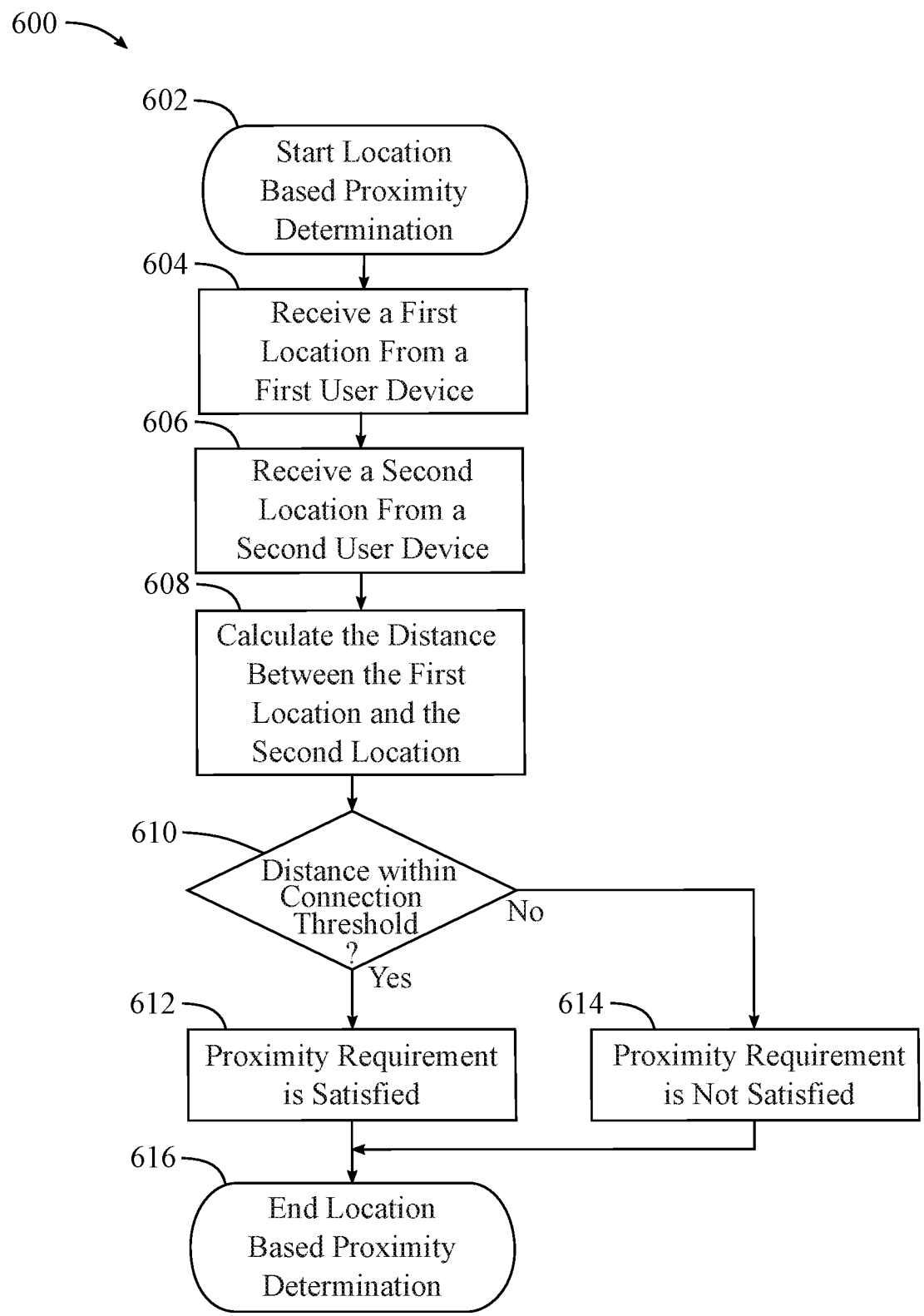
FIG. 6 depicts a flow diagram of an example process for a location-based proximity determination.

FIG. 6 depicts a flow diagram of an example process 600 for a location-based proximity determination. Also referring to FIG. 1 and FIG. 2, in some implementations, process 600 may be implemented in program code residing on server 140 of connection system 100 and be executed by one or more processors thereof. In some implementations, application and data services 144 may comprise process 600, and in some implementations proximity assessment module 252 may comprise process 600. Process 600 begins in block 602. In block 604, a first location is received by server 140 from a first user device (such as user device 120). In block 606, a second location is received by server 140 from a second user device (such as user device 130). In block 608, server 140 makes a proximity determination and calculates the distance between the first location and the second location. In block 610, server 140 checks to see if the distance is within a connection threshold distance, thereby satisfying a proximity requirement. If the distance is within a connection threshold distance (satisfying a proximity requirement), process 600 proceeds to block 612. If the distance is not within a connection threshold distance (not satisfying a proximity requirement), process 600 proceeds to block 614. Process 600 terminates in block 616. In some implementations, the first location and the second location in blocks 604 and 606, respectively, may be reported as geolocation data. In some implementations, a distance between a first geolocation and a second geolocation may be calculated using the haversine formula, which is commonly known in the art and determines the great-circle distance (which may at least partially account for earth curvature) between two points on a sphere (in the present application, the earth) given their longitudes and latitudes. In some implementations, a straight-line distance calculation may be used given the short distances of a connection threshold (e.g., 4 feet, 6 feet, etc.) and an evaluation threshold (e.g., 20 feet, 30 feet, etc.) in view of the earth's radius. In some implementations, Z or altitude values for geolocations may be used. For example, in some implementations, a two-part proximity test may be used wherein both the haversine calculated distance between two geolocations represented as longitude and latitude coordinates and the difference in altitude values for the two geolocations must be within a connection threshold. The addition of the altitude test may address situations where two users are on different floors of a building or structure. In some implementations, the first location and the second location in blocks 604 and 606, respectively, may be reported as localized location data, such as relative locations which may be relative to a common origin, such as localized positioning data as may be output by a Bluetooth beacon-based location service, wireless triangulation-based location service, or the like. In some implementations, a Pythagorean Theorem based distance formula, which is commonly used in the art may be used to calculate the distance between two localized locations expressed in X-Y coordinate pairs. In some implementations, where a Z axis component is present (i.e., X-Y-Z coordinate pairs), the three-dimensional formulation for the Pythagorean Theorem based distance formula may be used for proximity determinations.

Figure 7:
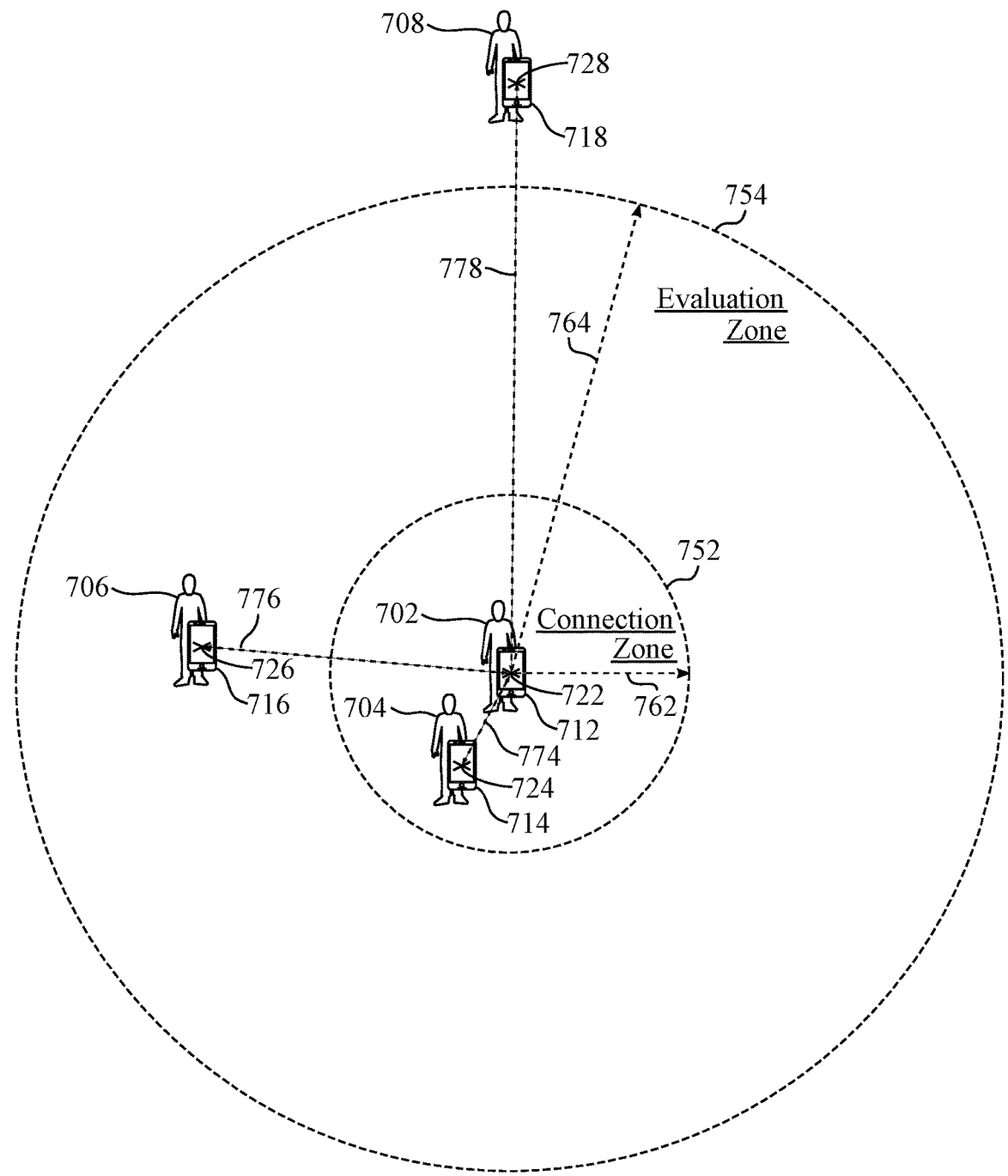
FIG. 7 is a diagram depicting example locations of users, a connection zone and an evaluation zone.

FIG. 7 is a diagram 700 depicting example locations of users 702, 704, 706 and 708, a connection zone 752 and an evaluation zone 754. Connection zone 752 may be defined by a connection threshold 762 about a location 722 of first user 702 and first user device 712; and evaluation zone 754 may be defined by an evaluation threshold about location 722 of first user 702 and first user device 712. As such, connection zone 752 and evaluation zone 754 of diagram 700 may be referred to as user 702's connection zone 752 and user 702's evaluation zone 754, respectively. User 704 and user device 714 may be located at location 724 within connection zone 752 (i.e., user 702's connection zone) at a distance 774 from location 722 of user 702 and is within a connection threshold 762 of user 702. As such, user 704 is within a connection threshold of user 702, thereby satisfying a proximity requirement for creating a connection between user 702 and user 704, and users 702 and 704 may be presented with a connection opportunity, whereupon a mutual acceptance thereof by user 702 and user 704, a connection therebetween may be created. Note that a connection zone of user 704 (not shown) and an evaluation zone of user 704 (not shown) may be centered on location 724 of user 704 and may be envisioned in diagram 700 as a translation (shifting) of connection zone 752 and evaluation zone 754 from being centered on location 722 of user 702 to being centered on location 724 of user 704. In some implementations, connection zone 752 and/or evaluation zone 754 may have perimeter boundaries having shapes other than the circular shapes depicted in FIG. 7, namely, a connection threshold 762 and an evaluation threshold 764 may be a predetermined function of the angle taken about location 722.

User 706 and user device 716 are located at location 726, wherein location 726 is outside of connection zone 752, i.e., distance 776 between location 726 of user 706 and location 722 of user 702 is greater than connection threshold 762. As such, user 706 is not within a connection threshold of user 702, thereby not satisfying a proximity requirement for creating a connection between user 702 and user 706, and a connection therebetween may not be created. User 706 and user device 716 are located within user 702's evaluation zone 754, i.e., distance 776 between location 726 of user 706 and location 722 of user 702 is within evaluation threshold 764. As such, user 706 is within an evaluation threshold 764 of user 702, and user 702 may be presented as a candidate connection to user 706, and user 706 may be presented to user 702 as a candidate connection, whereupon users 702 and 706 may consider and pursue a connection therebetween (such as for example, visually identifying each other nearby, moving within a connection threshold, e.g., connection threshold 762, of each other, receiving a connection opportunity—as a result of moving within a connection threshold of each other—and mutually accepting the connection opportunity thereby enabling a creation of a connection therebetween. Note that a connection zone (not shown) of user 706 and an evaluation zone (not shown) of user 706 may be centered on location 726 of user 706 and may be envisioned in diagram 700 as a translation (shifting) of connection zone 752 and evaluation zone 754 from being centered on location 722 of user 702 to being centered on location 726 of user 706.

User 708 and user device 718 are located at location 728, wherein location 726 is outside of user 702's connection zone 752, i.e., distance 778 between location 728 of user 708 and location 722 of user 702 is greater than connection threshold 762. As such, user 708 is not within a connection threshold of user 702, thereby not satisfying a proximity requirement for creating a connection between user 702 and 708, and a connection therebetween may not be created. User 708 and user device 718 are not located within user 702's evaluation zone 754, i.e., distance 778 between location 728 of user 708 and location 722 of user 702 is not within evaluation threshold 764. As such, user 708 is not within an evaluation threshold of user 702, and user 702 may not be presented as a candidate connection to user 708, and user 708 may not be presented to user 702 as a candidate connection. Note that a connection zone of user 708 (not shown) and an evaluation zone of user 708 (not shown) may be centered on location 728 of user 708 and may be envisioned in diagram 700 as a translation (shifting) of zones 752 and 754 from being centered on location 722 of user 702 to being centered on location 728 of user 708.

Figure 8A:
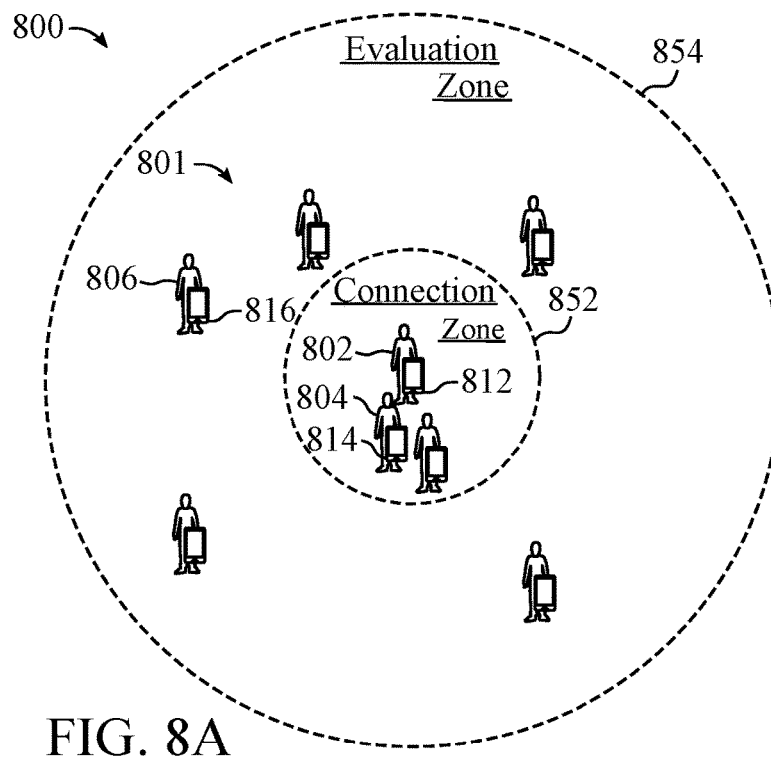
FIG. 8A is a diagram depicting an example arrangement of a plurality of users having user devices, and a connection zone and an evaluation zone.

FIG. 8A is a diagram 800 depicting an example arrangement of a plurality of users 801, such as user 802, user 804 and user 806, having user devices 812, 814 and 816, respectively, and a connection zone 852 and an evaluation zone 854. In the example arrangement of FIG. 8A, connection zone 852 and evaluation zone 854 are those of user 802, wherein the placement of the center of connection zone 852 and center of evaluation zone 854 are coincident with the location of user 802 and user device 812. User 804 and user device 814 are within connection zone 852 of user 802, and therefore satisfy a connection proximity requirement, and user 802 and user 804 may be notified on user device 812 and user device 814, respectively, of a connection opportunity therebetween. User 806 and user device 816 are outside of connection zone 852. As such, user 806 is not within a connection threshold of user 802, thereby not satisfying a proximity requirement for creating a connection between user 802 and user 806, and a connection therebetween may not be created. User 806 and user device 816 are located within evaluation zone 854. As such, user 806 is within an evaluation threshold of user 802, and user 802 may be presented as a candidate connection to user 806, and user 806 may be presented to user 802 as a candidate connection.

Figure 8B:
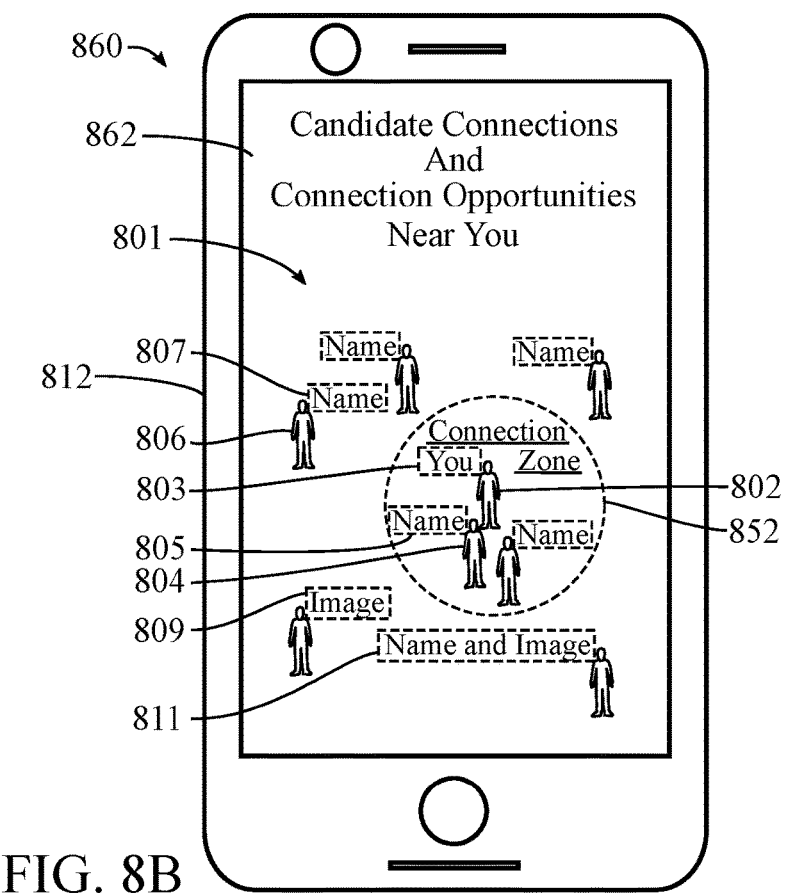
FIG. 8B depicts an example illustration of how the plurality of users of FIG. 8A may appear as candidate connections and connection opportunities on a display screen of user device.

FIG. 8B depicts an example illustration 860 of how plurality of users 801 of diagram 800 of FIG. 8A may appear as candidate connections and connection opportunities on a display screen 862 of user device 812 of user 802 depicted at the center of connection zone 852. In some implementations, one or more processors of server 140 may execute program code from one or more software models of application and data services 144 (see FIG. 1 and FIG. 2), such as proximity assessment module 252 and potential connection management module 254, to interact with user device 812 and user application logic thereon which may comprise program code executed by one or more processors user device 812 (such as user application logic 314, depicted in FIG. 3, which may be accessed via a user device application interface, such as user device application interface 312, via communications links and networks, such as communications network 160 and communications links 162, 163 and 164, by user app systems interface module 250 of application and data services 144 of server 140) to generate display screen 862 and its presentation on user device 812. In some implementations, potential connection management module 254 and data service module 253 may maintain in real-time and/or in near real-time (e.g., within several seconds) candidate connections connection opportunities in candidate connections 152 and connection opportunities 154, respectively, of database 142, which may be accessed by server 140 to maintain a real-time and/or near real-time representation, including relative locations, of current candidate connections and current connection opportunities of users 801 with respect to user 802 for presentation in display screen 862. In some implementations, server 140 may query candidate connections 152 of database 142 for all candidate connection user pairs comprising user 802 for display on display screen 862 in real-time and/or near real-time. In some implementations, server 140 may query connection opportunities 154 of database 142 for all connection opportunities user pairs comprising user 802 for display on display screen 862 in real-time and/or near real-time. The real-time/ near real-time display of candidate connections and connection opportunities in locations relative to user 802 may facilitate identification by user 802 of candidate connections and/or of connection opportunities, and thereby facilitate user 802's ability to engage a potential connection and form a new connection therewith. In some implementations, icons representing users 801 (such as user 802, user 804 and user 806) may be displayed on display screen 862 (e.g. and icon as shown in illustration 860 or some other suitable icon or graphical representation of users) in an arrangement relative to locations as may be reported by user devices associated with users 801. In some implementations, names (such as name 805 and name 807) as may be comprised by user profiles associated with users 801 (such as user 804 and user 806, respectively) may be displayed in an arrangement relative to locations as may be reported by user devices associated with users 801. In some implementations, a user 802 of user device 812 may be displayed with text "you" 803 or some other graphical representation to indicate user 802 of user device 812. In some implementations, images (such as image 809) as may be comprised by user profiles associated with users 801, such as head shot images or other images representative of users 801 as may be comprised by user profiles associated with users 801 may be displayed in an arrangement relative to locations as may be reported by user devices associated with users 801. In some implementations, names as may be comprised by user profiles associated with users 801 and images such as head shot images or other images representative of users 801 as may be comprised by user profiles associated with users 801 may be displayed in an arrangement relative to locations as may be reported by user devices associated with users 801 (such as name and image 811). In some implementations, one or more of icons (or other suitable graphical representation of a user), names and images may be displayed as a representation of a user on display screen 862 and may be displayed in an arrangement relative to locations as may be reported by user devices associated with users 801.

In some implementations, a user 802 of user device 812 may select a representation of a user (e.g., an icon, a name, an image, etc.) of a user within connection zone 852 displayed on display screen 862, whereupon a connection opportunity prompt may be displayed. For example, user 802 of user device 812 may select a representation of user 804 whereupon a connection opportunity prompt may be displayed such that user 802 may confirm a desire or otherwise indicate a positive interest in connecting with user 804. Similarly, user 804 of user device 814 (see FIG. 8A) may select on a display screen (not shown) of user device 814 a representation of user 802, whereupon a connection opportunity prompt may be displayed such that user 804 may confirm a desire or otherwise indicate a positive interest in connecting with user 802. Upon mutual acceptance of the connection opportunities presented to user 802 and user 804 presenting a connection opportunity therebetween, a connection therebetween may then be created, wherein in some implementations, server 140 executing program code of connection management module 255 and data service module 253 of application and data services 144 creates the connections and updates user network connections of user 802 and 804, such as may be comprised by connections 147 through connections 149 of database 142. In some implementations, upon creation of a connection, server 140 may remove from connection opportunities 154, the connection opportunity between user 802 and user 804, which may then cause an icon, name and and/or image of user 804 to be removed from display screen 862 of user device 812 of user 802.

In some implementations, a connection zone 852 may not be displayed and graphical representations of users 801, such user icons, names, images and the like may comprise a visual indication to highlight which users are within a connection proximity threshold of user 802 of user device 812. For example, user icons for users which are within a connection threshold of user 802 such as user 804 may be displayed in a predetermined color to indicate such user is within a connection proximity threshold and may be available for a connection therewith. In some implementations, both a connection zone 852 and a graphical representations of users comprising a visual indication to highlight which users are within a connection threshold of user 802 may be displayed to indicate connection opportunities on display screen 862.

Figure 9A:
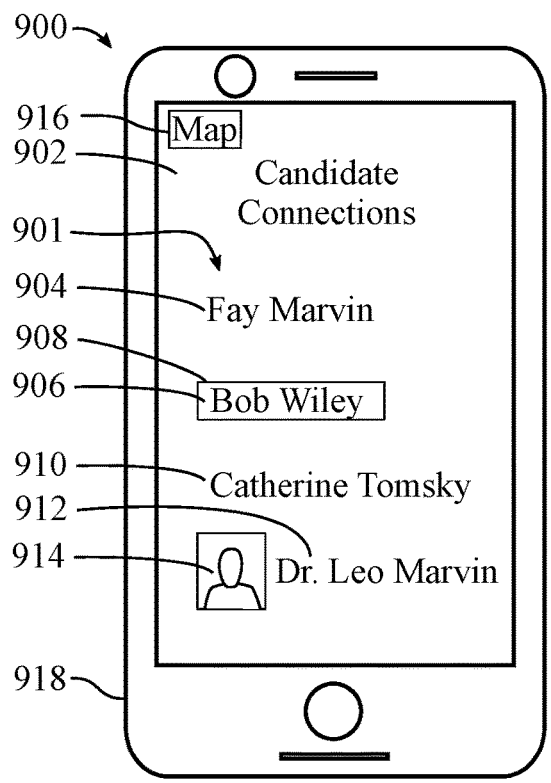
FIG. 9A is an illustration of an example candidate connections display screen.

In some implementations, a proximity-locked connection system may comprise a candidate connections screen which may be used to review candidate connections which may be within an evaluation zone of a user. FIG. 9A is an illustration 900 of an example candidate connections display screen 902 of a user device 918, wherein in the example depicted, candidate connections are displayed in a list 901, namely, a candidate connection 904, a candidate connection 906, a candidate connection 910 and a candidate connection 912 are displayed. In some implementations, a displayed candidate connection may be selectable by a user (for example, in the example illustration 900, candidate connection 906 "Bob Wiley" may be selectable—as may, in some implementations, be visually indicated as selectable by a box 908 or some other suitable visual indicator), wherein a user may select the candidate connection to see information which a user (Bob Wiley in the example shown) may have configured to be presented upon such selection. For example, user Bob Wiley may have set up meeting terms wherein a user may view such terms and arrange to meet the terms in order to establish a meeting with Bob Wiley, wherein during such a meeting, a connection proximity may be satisfied and a connection with Bob Wiley may be created upon a mutual acceptance of the connection. In another example, Bob Wiley may have configured an image, such as a head shot image, to be display upon a selection of his candidate connection 906. In some implementations, a candidate connection may be presented in candidate connections list 901 as an image 914 (such as a head shot), a name of candidate connection 912 or both (such as in the example illustration 900, wherein "Dr. Leo Marvin" name of candidate connection 912 and image 914 are both depicted. In some implementations, a candidate connections display screen 902 may comprise a toggle 916 to toggle between a candidate connections display screen 902 depicting candidate connections in a list 901, and a graphical representation such as is depicted in a map-like illustration 860 of FIG. 8B. Note that a toggle is not shown in FIG. 8B, but in some implementations, a toggle to toggle between display screen 862 of FIG. 8B and screen 902 of FIG. 9A may be included in display screen 862, may be labeled "list" rather than "map" (or some other suitable nomenclature), may be located similarly in an upper left portion of display screen 862 next to "candidate connections" and may be alternatively pressed in conjunction with "map" toggle 916 to toggle between screen 902 and display screen 862.

Figure 9B:
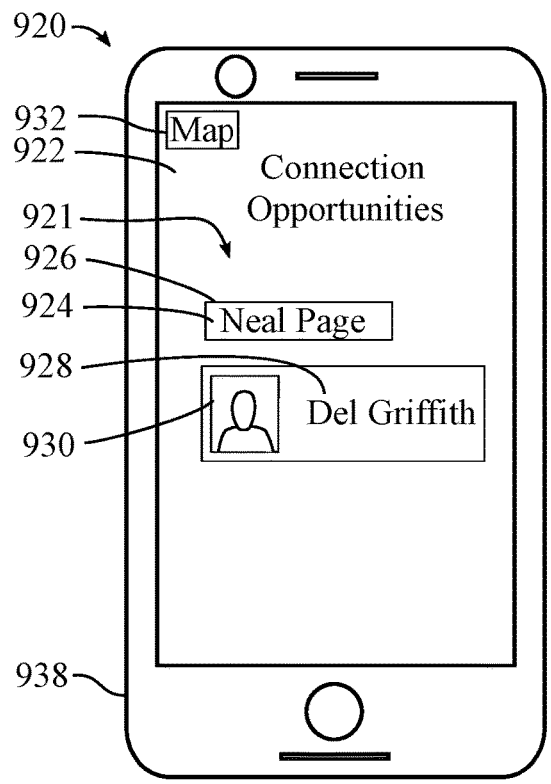
FIG. 9B is an illustration of an example connection opportunities display screen.

In some implementations, a proximity-locked connection system may comprise a connection opportunities screen which may be used to review connection opportunities which may be within a connection zone of a user. FIG. 9B is an illustration 920 of an example connection opportunities display screen 922 of a user device 938, wherein in the example depicted, connection opportunities are displayed in a list 921, namely, a connection opportunity 924 and a connection opportunity 928 are displayed. In some implementations, a displayed connection opportunity may be selectable by a user (for example, in the example illustration 920, connection opportunity 924 "Neal Page" may be selectable—as may be visually indicated as selectable by a box 926 or some other suitable visual indicator), wherein a user may select the connection opportunity and, in response, may be presented with a connection opportunity screen, wherein the user may indicate a desire to connect to the selected connection opportunity 924 Neal Page, as discussed in conjunction with FIG. 9C. In some implementations, a connection opportunity may be presented in connection opportunities list 921 as an image 930 (such as a head shot), a name of connection opportunity 928 or both (such as in the example illustration 920, wherein "Del Griffith" name of connection opportunity 928 and image 930 are both depicted. In some implementations, a connection opportunities display screen 922 may comprise a toggle 932 to toggle between a connection opportunities display screen 922 depicting connection opportunities in a list 921, and a graphical representation such as is depicted in a map-like illustration 860 of FIG. 8B. Note that a toggle is not shown in FIG. 8B, but in some implementations, a toggle to toggle between display screen 862 of FIG. 8B and display screen 922 of FIG. 9B may be included in display screen 862, may be labeled "list" rather than "map" (or some other suitable nomenclature), may be located similarly in an upper left portion of display screen 862 next to "connection opportunities" and may be alternatively pressed in conjunction with "map" toggle 932 to toggle between display screen 922 and display screen 862.

Figure 9C:
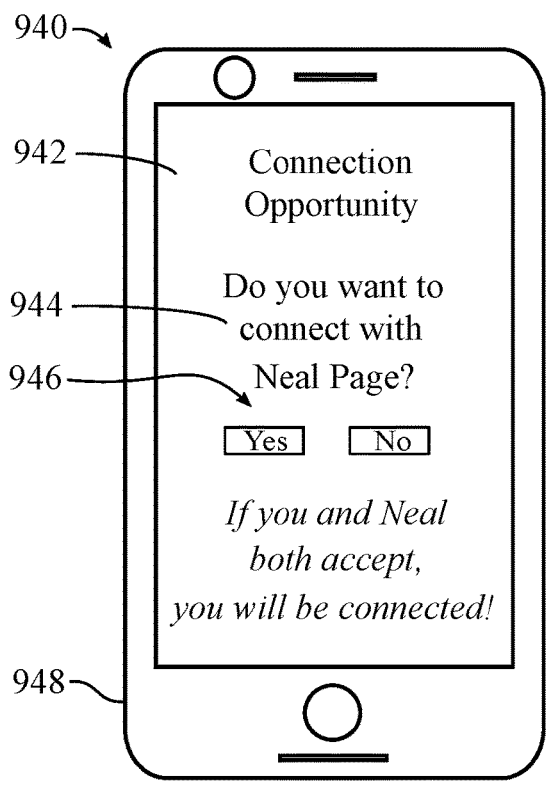
FIG. 9C is an illustration of an example connection confirmation display screen of a user device useable by a user to accept a connection opportunity.

FIG. 9C is an illustration 940 of an example connection confirmation display screen 942 of a user device 948 useable by a user to accept a connection opportunity, wherein example display screen 942 comprises a prompt 944 asking a user of user device 948 if they want to connect with a user displayed thereon (in example illustration 940, Neal Page), which may have been a connection opportunity selected from candidate opportunities list 921 of FIG. 9B. A user of device may confirm a desire to connect or otherwise indicate a positive interest in connecting with Neal Page by selecting a yes or no response from responses 946. As discussed earlier in conjunction with FIG. 5A and FIG. 5B, upon mutual acceptance of the connection opportunity (user of user device 948 selects "yes" of responses 946 and Neal Page also accepts the connection opportunity displayed on a user device thereof), server 140 (see FIG. 1) executing program code of connection management module 255 and data service module 253 (see FIG. 2) of application and data services 144 may create the connections and may accordingly update user network connections, such as may be comprised by connections 147 through connections 149 of database 142. In some implementations, upon creation of a connection, server 140 may remove from connection opportunities 154, the connection opportunity associated with the newly created connection.

Figure 9D:
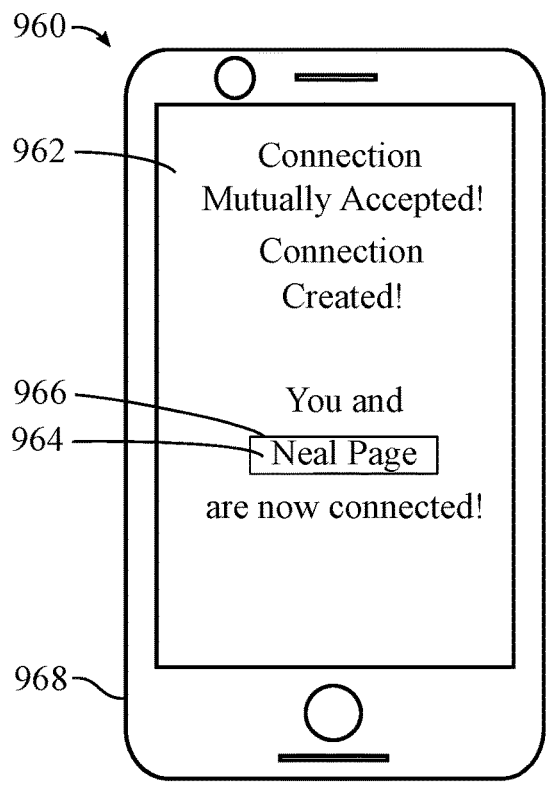
FIG. 9D is an illustration of an example connection created display screen.

FIG. 9D is an illustration 960 of an example connection created display screen 962 of a user device 968 useable by a user of user device 968 to receive notice of a newly created connection with Neal Page, wherein example display screen 962 indicates Neal Page 964 is the new connection, and wherein in some implementations, a visual indication, such as a box 966 (or a predetermined color, a bolding, etc.) may indicate Neal Page is selectable, and whereupon such selection, user device 968 may interact with server 140 and retrieve additional profile data from a user account of user Neal Page which may be comprised by user accounts 145 of database 142 and which may now be accessible by the user now selecting Neal Page 964 on device 968 due to the newly created connection therebetween.

In some implementations, a proximity-locked connection system may require that an established connection be refreshed prior to an expiration of the established connection, wherein to refresh a connection and reset an expiration date thereof (or reset an expiration timer associated therewith), a physical proximity requirement must be met. In some implementations, a physical proximity requirement to refresh a connection may be the same as a physical proximity requirement to establish a connection. In some implementations, a physical proximity requirement to refresh a connection may be different than a physical proximity requirement to establish a connection. In some implementations, a physical proximity requirement to refresh a connection may be satisfied by the two users of the connection being within a connection refresh threshold from each other, wherein in some implementations, a connection refresh threshold may be the same as a connection threshold. In some implementations, a connection refresh threshold may be the same as an evaluation threshold. In some implementations, a connection refresh threshold may be a predetermined distance, wherein a distance between two user devices of two users of a connection that is within the predetermined connection refresh threshold distance meets a connection refresh proximity requirement.

In some implementations, a minimum time for two user devices (and users thereof) to be within the connection refresh threshold must be met to satisfy a proximity requirement for refreshing a connection, wherein the minimum time may be called a connection refresh dwell time, and the connection refresh dwell time may be chosen to filter out incidental contact and/or proximity between the two users of a connection. In some implementations, a connection refresh dwell time may be 10 minutes, wherein such a dwell time may reflect a likelihood of an interaction between two users of a connection. In some implementations, another suitable connection refresh dwell time may be used, such as 5 minutes, 15 minutes, a half hour, and the like). In some implementations, two users of a connection who periodically interact in ways that satisfy a connection refresh proximity requirement and connection refresh dwell time requirement may never approach an expiration of their connection (such as two users who meet face-to-face periodically in the course of their business activities, careers, etc.) In some implementations, two users of a connection may receive a warning notification of an impending expiration of their connection, such that they may attempt to satisfy a connection refresh requirement(s) prior to such expiration. In some implementations, a predetermined type of interaction (messaging between the two users, a reading by one user of a post writing of the other user, etc.) and/or predetermined volume of interaction between two connected users facilitated or conducted through a proximity-locked connection system, may refresh a connection, wherein an expiration date of the connection may be reset without a need to meet face-to-face or find some other way to satisfy a connection refresh proximity requirement.

In some implementations, a connection expiration date (or connection expiration timer) may be set or configured (or started) in block 524 of FIG. 5A or in block 572 of FIG. 5B. In some implementations, a connection expiration date or connection expiration timer may be configured (initialized, set, started, etc.) by server 140 (which, in some implementations, may be executing program code comprised in connections management module 255—see FIG. 2) in connections 147 through connections 149 of database 142 upon the establishment of a connection and a refresh of a connection. As will be apparent to those skilled in the art, there are many ways to configure database 142 and store connections therein. For example, in some implementations, a database table may record all connections, (e.g., a connections table), wherein each record therein may comprise a first foreign key for a first user ID (a unique ID associated with a first user/user account) of a first user of a connected pair of users, and second foreign key for a second user ID (a unique ID associated with a second user/user account) of a second user of a connected pair of users. In such implementations of a connections table, a given user network may be assessed by a database query for all connection records comprising the given user's unique user ID in either the first user ID foreign key or the second user ID foreign key. Note that the first user and second user assignment in a connected pair of users in a connections table may be arbitrary with respect to the existence of a connection between the two users of the pair, however it may be used to indicate which of the two users of the connection accepted the connection first by assigning that user the first user foreign key field in the connection record. In such implementations of a connections table (not shown), a connection expiration date field or connection expiration timer field may be comprised by each connection record of the connections table, and a connection associated with a connection record of the connection table may be determined to be an expired connection when the connection expiration date field in the connection record is prior to the current date or a connection expiration timer field is expired (e.g., zero or less for a countdown type of connection expiration timer). In some implementations, upon an occurrence of the connection expiration date (or by the end of the connection expiration date, or upon expiration of the connection expiration timer), the connection expires and, in some implementations, may be disabled (or be deleted), wherein in some implementations, each user of the connection may receive a notice that their connection with the other user of the connection has expired and has been disabled (or deleted).

In some implementations, process 500 and process 540 of FIG. 5A and FIG. 5B, respectively, as discussed above, may be configured to first check to see if there is an existing connection between two users of two user devices reporting locations in block 506 and block 546, respectively, and may reset or not reset a connection expiration date (or connection expiration timer) for an existing connection as discussed above based on a distance between reported locations of two user devices associated with the existing connection being within a connection refresh threshold of each other or not being within a connection refresh threshold of each other, respectively.

While the principles of the disclosure have been described above in connection with specific systems and methods, it is to be understood that this description is made only by way of example and not limitation on the scope of the disclosure. Although several implementations have been illustrated and described in detail, it will be recognized that substitutions and alterations are possible without departing from the spirt and scope of the appended claims. Modifications, additions, or omission may be made to the methods described above without departing from the scope of the disclosure. Additionally, the steps may be performed in any suitable order without departing from the scope as well.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, software, firmware, and/or combinations of hardware, software or firmware. As used herein, the term module is intended to be broadly construed as hardware, software or firmware, and/or combinations of hardware, software or firmware.

It will be apparent that systems and/or methods, described herein, may be implemented in different forms of hardware, software, firmware, or combinations of hardware, software or firmware. The actual specialized control hardware or software code used to implement these systems and/or methods is not limiting of the implementations. Thus, the operation and behavior of the systems and/or methods were described herein without reference to specific software code, as it is understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set unless such combination is contradictory to the disclosure.

No element, act, or instruction used herein should be construed as required, critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more" unless it is stated or implicit that the set may be a null set. Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system for creating and maintaining user network connections among users of a user network, the system comprising:
   one or more servers, each server configured to communicate over a communications network;

a plurality of user devices, each user device operable by a user of the user device, wherein the user device is configured to communicate over a communications network and interact with the one or more servers, thereby enabling the user of the user device to interact with the one or more servers; and one or more databases accessible by the one or more servers, wherein the one or more databases comprise:
a plurality of user accounts, wherein:
a first user account is associated with a first user having a first user device; and
a second user account is associated with a second user having a second user device; and
a plurality of user network connections, each user network connection representing a user network connection between two users, wherein the one or more servers are further configured to:
receive from the first user device a first location of the first user device;
receive from the second user device a second location of the second user device;
calculate a distance between the first location and the second location, thereby determining a distance between the first user device and the second user device;
determine that the distance between the first user device and the second user device is within a predetermined connection threshold distance;
create a user network connection between the first user and the second user at least in part due to the distance between the first user device and the second user device being within the predetermined connection threshold distance; and
configure a connection expiration date or connection expiration timer for the user network connection between the first user and the second user, wherein upon an occurrence of the connection expiration date or an expiration of the connection expiration timer, the one or more servers are further configured to disable or delete the user network connection between the first user and the second user.

2. The system of claim 1, wherein the database further comprises a plurality of user networks, associated with the user accounts, wherein upon creation of the user network connection between the first user and the second user:
the first user account has a first user network comprising a user network connection to the second user; and
the second user account has a second user network comprising a user network connection to the first user.

3. The system of claim 1, wherein the first location and the second location are geolocations.

4. The system of claim 3, wherein the first location and second location originate from a first global positioning system (GPS) module comprised by the first user device and a second GPS module comprised by the second user device.

5. The system of claim 1, wherein the first location and second location are localized relative to a local point of origin.

6. The system of claim 5, wherein the first location and the second location originate from a Bluetooth beacon-based location service.

7. The system of claim 5, wherein the first location and the second location originate from a wireless triangulation-based location service.

8. The system of claim 1, wherein the one or more servers are further configured to:

receive from a third user device a third location of the third user device;
receive from a fourth user device a fourth location of the fourth user device;
calculate a distance between the third location and the fourth location, thereby determining a distance between the third user device and the fourth user device;
determine that the distance between the third user device and the fourth user device is within a predetermined evaluation threshold distance;
facilitate a display of a candidate connection of the third user with the fourth user on the third user device due at least in part to the distance between the third user device and the fourth user device being within the predetermined evaluation threshold distance; and
facilitate a display of a candidate connection of the fourth user with the third user on the fourth user device due at least in part to the distance between the third user device and the fourth user device being within the predetermined evaluation threshold distance.

9. The system of claim 8, wherein the candidate connection of the third user with the fourth user is displayed on the third user device in a map-like representation.

10. The system of claim 8, wherein the candidate connection of the third user with the fourth user is displayed on the third user device in a list of one or more candidate connections.

11. The system of claim 8, wherein the one or more servers are further configured to:
receive from a fifth user device a fifth location of the fifth user device;
calculate a distance between the fifth location and the fourth location, thereby determining a distance between the fifth user device and the fourth user device;
determine that the distance between the fifth user device and the fourth user device is within a predetermined connection threshold distance;
facilitate a display of a connection opportunity of the fifth user with the fourth user on the fifth user device due at least in part to the distance between the fifth location user device and the fourth user device being within the predetermined connection threshold distance; and
facilitate a display of a connection opportunity of the fourth user with the fifth user on the fourth user device due at least in part to the distance between the fifth user device and the fourth user device being within the predetermined connection threshold distance.

12. The system of claim 11, wherein the connection opportunity of the fifth user with the fourth user is displayed on the fifth user device in a map-like representation.

13. The system of claim 11, wherein the connection opportunity of the fifth user with the fourth user is displayed on the fifth user device in a list of one or more connection opportunities.

14. The system of claim 11, wherein upon a selection by a fifth user of the connection opportunity displayed on the fifth user device, the one or more servers are further configured to facilitate a display of a connection confirmation display screen on the fifth user device, wherein the fifth user may indicate an acceptance of the connection opportunity to connect with a fourth user.

15. The system of claim 14, wherein upon a selection by the fourth user of the connection opportunity displayed on the fourth user device, the one or more servers are further configured to:
receive an acceptance of the connection opportunity displayed the fifth user device;

facilitate a display of a connection confirmation display screen on the fourth user device;

receive an acceptance of the connection opportunity displayed on the fourth user device; and create a user network connection at least in part due to a mutual acceptance of the connection opportunity displayed on the fourth user device and the connection opportunity displayed on the fifth user device.

16. The system of claim 11, wherein both the candidate connection of the fourth user with the third user and the connection opportunity of the fourth user with the fifth user are displayed on the fourth user device in a map-like representation.

17. The system of claim 1, wherein the distance between the first user device and the second user device is a first distance between the first user device and the second user device and the one or more servers are further configured to:

receive from the first user device a third location of the first user device;

receive from the second user device a fourth location of the second user device;

calculate a distance between the third location and the fourth location, thereby determining a second distance between the first user device and the second user device;

determine that the second distance between the first user device and the second user device is within a predetermined connection refresh threshold distance; and reset the connection expiration date or reset the connection expiration timer at least in part due to the second distance between the first user device and the second user device being within the predetermined connection refresh threshold distance.

18. A method for connecting users, the method comprising:

providing a proximity-locked user network connection system, the proximity-locked user network connection system comprising:

one or more servers, each server configured to communicate over a communications network;

a plurality of user devices, each user device operable by a user of the user device, wherein the user device is configured to communicate over a communications network and interact with the one or more servers, thereby enabling the user of the user device to interact with the one or more servers; and one or more databases accessible by the one or more servers, wherein the one or more databases comprise:

a plurality of user accounts, wherein:

a first user account is associated with a first user having a first user device; and a second user account is associated with a second user having a second user device; and a plurality of user network connections, each user network connection representing a connection between two users;

receiving, by the one or more servers from the first user device a first location of the first user device;

receiving, by the one or more servers from the second user device a second location of the second user device;

calculating, by the one or more servers a distance between the first location and the second location, thereby determining a distance between the first user device and the second user device;

determining, by the one or more servers that the distance between the first user device and the second user device is within a predetermined connection threshold distance;

creating, by the one or more servers a user network connection between the first user and the second user at least in part due to the distance between the first user device and the second location user device being within the predetermined connection threshold distance; and configuring, by the one or more servers a connection expiration date or connection expiration timer for the user network connection between the first user and the second user, wherein upon an occurrence of the connection expiration date or an expiration of the connection expiration timer, the one or more servers are further configured to disable or delete the user network connection between the first user and the second user.

19. The method of claim 18, wherein the distance between the first user device and the second user device is a first distance between the first user device and the second user device, the method further comprising:

receiving, by the one or more servers from the first user device a third location of the first user device;

receiving, by the one or more servers from the second user device a fourth location of the second user device;

calculating, by the one or more servers a distance between the third location and the fourth location, thereby determining a second distance between the first user device and the second user device;

determining, by the one or more servers that the second distance between the first user device and the second user device is within a predetermined connection refresh threshold distance; and resetting, by the one or more servers the connection expiration date or the connection expiration timer at least in part due to the second distance between the first user device and the second user device being within the predetermined connection refresh threshold distance.

* * * * *